US012101583B2

United States Patent
Mihara et al.

(10) Patent No.: US 12,101,583 B2
(45) Date of Patent: Sep. 24, 2024

(54) INFORMATION GENERATION DEVICE, INFORMATION GENERATION METHOD AND PROGRAM

(71) Applicant: SONY CORPORATION, Tokyo (JP)

(72) Inventors: Hajime Mihara, Kanagawa (JP); Shun Kaizu, Kanagawa (JP); Teppei Kurita, Tokyo (JP); Yasutaka Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 931 days.

(21) Appl. No.: 17/059,353

(22) PCT Filed: Mar. 13, 2019

(86) PCT No.: PCT/JP2019/010209
§ 371 (c)(1),
(2) Date: Nov. 27, 2020

(87) PCT Pub. No.: WO2019/235019
PCT Pub. Date: Dec. 12, 2019

(65) Prior Publication Data
US 2021/0211619 A1 Jul. 8, 2021

(30) Foreign Application Priority Data
Jun. 5, 2018 (JP) ................................. 2018-107625

(51) Int. Cl.
*H04N 9/31* (2006.01)
*G01J 4/04* (2006.01)
(Continued)

(52) U.S. Cl.
CPC .............. *H04N 9/3167* (2013.01); *G01J 4/04* (2013.01); *G02B 27/283* (2013.01); *G06T 5/70* (2024.01);
(Continued)

(58) Field of Classification Search
CPC ...... H04N 25/60; H04N 25/671; H04N 25/11; H04N 23/81; G06T 5/70
See application file for complete search history.

(56) References Cited

U.S. PATENT DOCUMENTS

2013/0016189 A1 1/2013 Hosaka
2015/0285811 A1 10/2015 Fontaine
(Continued)

FOREIGN PATENT DOCUMENTS

CN 101584222 A 11/2009
CN 105814607 A 7/2016
(Continued)

OTHER PUBLICATIONS

Liu et al., Global positioning method based on polarized light compass system, Review of Scientific Instruments, May 23, 2018, vol. 89, pp. 054503-1-054503-9.

*Primary Examiner* — Kelly L Jerabek
(74) *Attorney, Agent, or Firm* — Paratus Law Group, PLLC

(57) ABSTRACT

An information generation unit 30 acquires, from a polarization imaging unit 20, observation values in which polarization directions are at least three or more directions (m≥3). A noise amount calculation unit 35-1 calculates an amount of noise on the basis of an observation value in a first polarization direction. Similarly, noise amount calculation units 35-2 to 35-*m* calculate amounts of noise on the basis of observation values in second to m-th polarization directions. A polarization model estimation unit 36 estimates a polarization model by using the observation values for the respective polarization directions and the amounts of noise calculated by the noise amount calculation units 35-1 to 35-*m*. Thus, it is possible to calculate a polarization model that is robust against noise.

16 Claims, 16 Drawing Sheets

(51) Int. Cl.
*G02B 27/28* (2006.01)
*G06T 5/70* (2024.01)
*H04N 23/81* (2023.01)
*H04N 25/11* (2023.01)
*H04N 25/671* (2023.01)

(52) U.S. Cl.
CPC ............ *H04N 23/81* (2023.01); *H04N 25/11* (2023.01); *H04N 25/671* (2023.01)

(56) References Cited

U.S. PATENT DOCUMENTS

| | | |
|---|---|---|
| 2017/0059877 A1 | 3/2017 | Fest et al. |
| 2017/0184700 A1 | 6/2017 | Aycock et al. |
| 2017/0223339 A1* | 8/2017 | Kondo ...................... G06T 7/55 |
| 2017/0366802 A1 | 12/2017 | Hirasawa |
| 2018/0007291 A1* | 1/2018 | Ida ......................... H04N 23/63 |
| 2019/0260974 A1* | 8/2019 | Kaizu .................. H04N 25/134 |
| 2021/0235060 A1* | 7/2021 | Hirasawa .................. G02B 3/00 |
| 2021/0281786 A1* | 9/2021 | Kurita .................... H04N 25/76 |

FOREIGN PATENT DOCUMENTS

| | | |
|---|---|---|
| CN | 106461538 A | 2/2017 |
| EP | 3264754 A1 | 1/2018 |
| JP | 2009053116 A | 3/2009 |
| JP | 2011133361 A | 7/2011 |
| JP | 4974543 B2 | 7/2012 |
| JP | 2017-208642 A | 11/2017 |
| JP | 2018029279 A | 2/2018 |
| WO | WO-2014119257 A1 | 8/2014 |
| WO | WO-2017002716 A1 | 1/2017 |
| WO | WO 2017/085993 A1 | 5/2017 |
| WO | WO 2018/074064 A1 | 4/2018 |

* cited by examiner

INFORMATION GENERATION DEVICE, INFORMATION GENERATION METHOD AND PROGRAM

CROSS REFERENCE TO PRIOR APPLICATION

This application is a National Stage Patent Application of PCT International Patent Application No. PCT/JP2019/010209 (filed on Mar. 13, 2019) under 35 U.S.C. § 371, which claims priority to Japanese Patent Application No. 2018-107625 (filed on Jun. 5, 2018), which are all hereby incorporated by reference in their entirety.

TECHNICAL FIELD

This technology relates to an information generation device, an information generation method, and a program, and calculates a polarization model that is robust against noise.

BACKGROUND ART

When reflection components and the like are separated by using polarization, it has been practiced that the intensity of transmitted light transmitted through a polarizer is fitted to a cosine curve that is a polarization model. For example, in Patent Document 1, separation into a non-polarized component and a polarized component that is a reflection component is performed on the basis of the cosine curve after fitting. Furthermore, in Patent Document 2, polarization characteristics of a subject is obtained with high sensitivity by calculating a low-sensitivity polarization model on the basis of a low-sensitivity polarization image and calculating a high-sensitivity polarization model having the same phase component as the low-sensitivity polarization model from an unsaturated image in a high-sensitivity polarization image.

CITATION LIST

Patent Document

Patent Document 1: Japanese Patent No. 4974543
Patent Document 2: WO 2017/085993 A

SUMMARY OF THE INVENTION

Problems to be Solved by the Invention

By the way, in a case where a high-sensitivity polarization model is calculated from an unsaturated image in a high-sensitivity polarization image, it is known that, in a function fitting by a least squares method, accuracy of fitting is good in a case where variation in observation values follows a normal distribution with the same variance. For this reason, for example, when a polarization image includes shot noise of an image sensor in which the variance changes depending on luminance, the accuracy of the calculated polarization model decreases.

Thus, it is an object of the present technology to provide an information generation device, an information generation method, and a program that are able to calculate a polarization model that is robust against noise.

Solutions to Problems

A first aspect of this technology is in an information generation device including:
a noise amount calculation unit that calculates an amount of noise on the basis of an observation value for each of a plurality of polarization directions; and
a polarization model estimation unit that estimates a polarization model by using the observation value and the amount of noise calculated by the noise amount calculation unit.

In this technology, a variance depending on the observation value is calculated as the amount of noise by using a noise variance model showing a relationship between the observation value for each of the plurality of polarization directions and a variance. The noise variance model may be stored in advance, or by detecting a plurality of observation areas, for example, flat areas or still areas, from a captured image, and obtaining a variance from a plurality of observation values and an average observation value in each of the observation areas, the noise variance model may be generated from average observation values and variances in the plurality of observation areas. The information generation device estimates the polarization model by using the observation value and the calculated amount of noise, or detects an observation value in a saturated state and estimates the polarization model without using the observation value in the saturated state.

Furthermore, level correction is performed of making the observation value for each of the plurality of polarization directions acquired for each of a plurality of drive modes having different sensitivities or exposure times uniform, and the amount of noise is calculated by using the corrected observation value, a correction gain used in the level correction, and the noise variance model. Moreover, the polarization model may be estimated by using the corrected observation value and the calculated amount of noise.

For the observation value for each of the plurality of polarization directions, an observation value is used in which the polarization directions are three or more directions. Furthermore, a polarization imaging unit may be included that acquires the observation value for each of the plurality of polarization directions. Furthermore, the polarization imaging unit may store a noise variance model, and the noise amount calculation unit may calculate the amount of noise by using the noise variance model stored in the polarization imaging unit.

A second aspect of this technology is in
an information generation method including:
calculating, by a noise amount calculation unit, an amount of noise on the basis of an observation value for each of a plurality of polarization directions; and
estimating, by a polarization model estimation unit, a polarization model by using the observation value and the amount of noise calculated by the noise amount calculation unit.

A third aspect of this technology is in
a program that causes a computer to execute generation of information based on an observation value for each of a plurality of polarization directions,
the program causing the computer to execute:
a procedure of calculating an amount of noise on the basis of the observation value for each of the plurality of polarization directions; and
a procedure of estimating a polarization model by using the observation value and the calculated amount of noise.

Note that, the program of the present technology is, for example, a program that can be provided to a general-purpose computer capable of executing various program codes, by a storage medium, a communication medium to be provided in a computer readable form, for example, a storage medium such as an optical disk, a magnetic disk, or a semiconductor memory, or a communication medium such as a network. By providing such a program in a computer readable form, processing is implemented according to the program on the computer.

Effects of the Invention

According to this technology, a polarization model is estimated by calculating an amount of noise on the basis of an observation value for each of a plurality of polarization directions and using the observation value and the calculated amount of noise. For this reason, it becomes possible to calculate a polarization model that is robust against noise. Note that, the advantageous effects described in this specification are merely exemplifications, and the advantageous effects of the present technology are not limited to them and may include additional effects.

MODE FOR CARRYING OUT THE INVENTION

Figure 1:
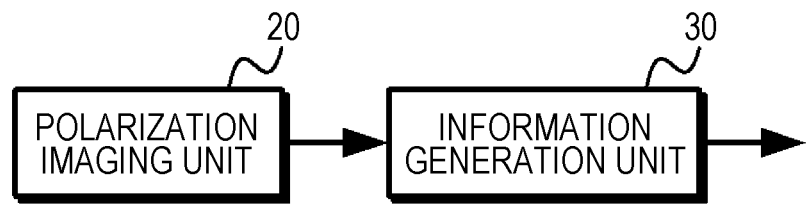
FIG. 1 is a diagram exemplifying a configuration of an information generation system.

The following is a description of embodiments for carrying out the present technology. Note that, description will be made in the following order.

1. Information generation system
2. Polarization imaging unit
2-1. Noise of polarization image
3. Information generation unit
3-1. First embodiment
3-2. Coefficients of noise variance model
3-3. Second embodiment
3-4. Third embodiment
3-5. Fourth embodiment
3-6. Fifth embodiment
3-7. Sixth embodiment
3-8. Other embodiments
4. Information obtained from polarization model
5. Application examples

1. INFORMATION GENERATION SYSTEM

When a scene is observed while a polarizing element is rotated, an observation value (luminance) changes depending on a direction of the polarizing element. Here, when a rotation angle (polarization angle) of the polarizing element is "u", a change in the observation value can be expressed by a polarization model shown in an equation (1).

$$I(u)=A \sin(2u)+B \cos(2u)+C \qquad (1)$$

FIG. 1 exemplifies a configuration of an information generation system. An information generation system 10 includes a polarization imaging unit 20 and an information generation unit 30. The polarization imaging unit 20 acquires a polarization image of a desired subject, the information generation unit 30 estimates a polarization model for the desired subject on the basis of the polarization image acquired by the polarization imaging unit 20, and calculates parameters A, B, and C of the equation (1).

2. POLARIZATION IMAGING UNIT

Figure 2:
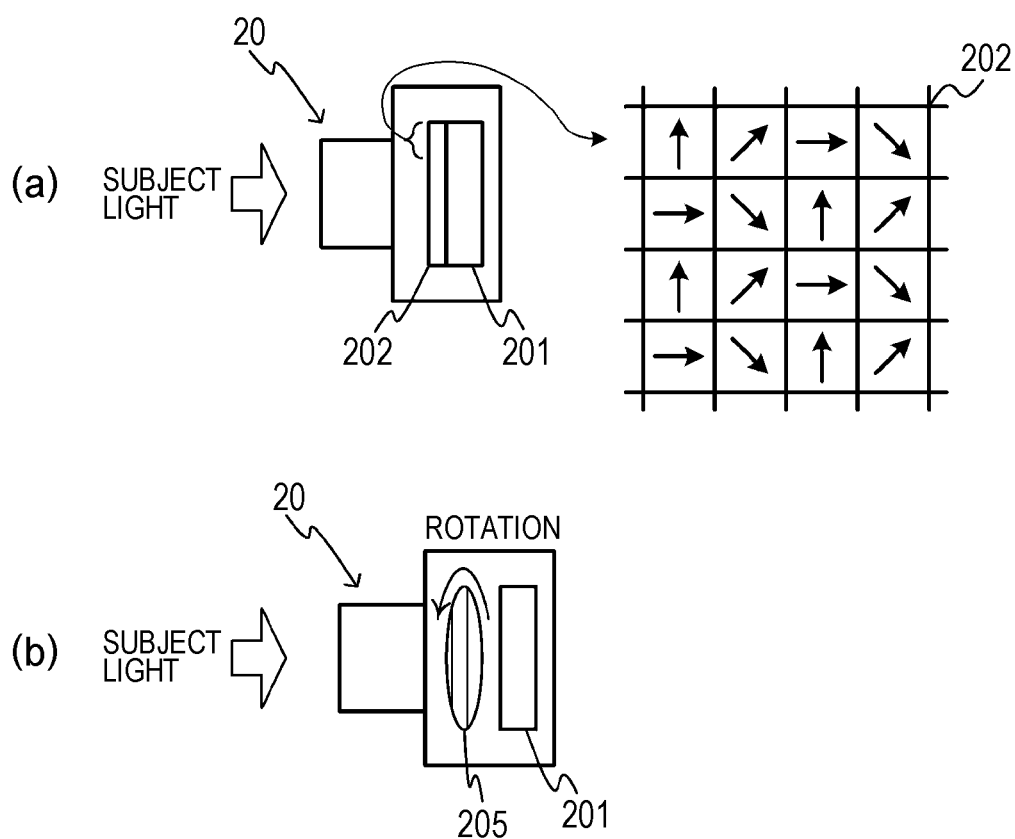
FIG. 2 is a diagram exemplifying a configuration of a polarization imaging unit.

The polarization imaging unit 20 acquires an observation value for each of a plurality of polarization directions. FIG. 2 exemplifies a configuration of the polarization imaging unit. For example, as illustrated in (a) of FIG. 2, the polarization imaging unit 20 includes a polarizing filter 202 having a pixel configuration of a plurality of polarization directions arranged in an image sensor 201, and acquires a polarization image. Note that, (a) of FIG. 2 exemplifies a case where the polarizing filter 202 in which each pixel is any one of pixels of four different polarization directions (the polarization directions are indicated by arrows) is arranged on the front surface of the image sensor 201. If the polarization imaging unit is configured as described above, it is possible to acquire the observation value for each of the plurality of polarization directions in units of a 2×2 pixel block. Furthermore, if interpolation processing is performed by using pixel values in equal polarization directions and an observation value at a pixel position in a different polarization direction is calculated, it is possible to acquire an observation value for each of the plurality of polarization directions, for each pixel. Furthermore, for example, as illustrated in (b) of FIG. 2, the polarization imaging unit 20 may acquire a polarization image for each of the plurality of polarization directions by providing a polarizing plate 205 to be rotatable as illustrated by an arrow, with the lens optical axis of the polarization imaging unit 20 as a rotation axis, on the front surface of the image sensor 201, and by performing imaging for each of a plurality of rotation positions of the polarizing plate 205. If the polarization imaging unit is configured as described above, it is possible to acquire an observation value for each of the plurality of polarization directions for a pixel, for a subject that does not move. Furthermore, although not illustrated, with a configuration in which polarizing plates having different polarization directions are provided in front of a plurality of imaging units, a plurality of polarization images having different polarization directions may be generated by performing imaging with the plurality of imaging units from the same position sequentially.

2-1. Noise of Polarization Image

The polarization imaging unit 20 is configured by using the image sensor as described above, and noise generated in the image sensor is classified into fixed pattern noise and random noise. The fixed pattern noise is noise generated at a fixed position on an image regardless of the timing of imaging. The fixed pattern noise is generated due to variation in the characteristics of the amplifier circuit of the photodiode. The random noise is mainly generated by optical shot noise and thermal noise. The optical shot noise is generated by the fact that the number of photons reaching the photodiode of the image sensor statistically fluctuates. The optical shot noise is modeled by a Poisson distribution, but is expressed as a normal distribution in an area where the luminance is large to some extent. The thermal noise is noise generated by the fact that free electrons in the resistor in the amplifier circuit irregularly vibrates due to thermal motion, and is expressed by a normal distribution.

Thus, the observed random noise of the image sensor is observed as a distribution obtained by mainly adding the normal distribution of the optical shot noise and the normal distribution of the thermal noise together. That is, the noise generated in the image sensor is expressed by the normal distribution shown in an equation (2) with a standard deviation $\sigma(i)$, a variance $\sigma^2(i)$, and an average value $i$ of the distribution as parameters. Note that, in a case where the luminance is observed by using the image sensor, the average value $i$ of the distribution corresponds to a true luminance value.

[Expression 1]

$$p(x) = N(i, \sigma^2(i)) = \frac{1}{\sqrt{2\pi\sigma^2(i)}} \exp\left(-\frac{(x-i)^2}{2\sigma^2(i)}\right) \quad (2)$$

Furthermore, it is known that the variance due to the shot noise linearly increases with respect to the luminance value, and in the present invention, the variance $\sigma^2(i)$ is expressed as a parametric noise variance model shown in an equation (3) by using two coefficients $c_0$ and $c_1$. Note that, the coefficient $c_0$ of the noise variance model corresponds to a variance of a distribution of the thermal noise, and a multiplication result of the coefficient $c_1$ and an observation value $i$ corresponds to a variance of a distribution of the shot noise. Furthermore, values of the coefficients $c_0$ and $c_1$ of the noise variance model change depending on drive parameters (for example, gain and exposure time) of the image sensor. Note that, each imaging operation performed by switching the drive parameters is also referred to as a drive mode.

$$\sigma^2(i) = c_0 + c_1 \cdot i \quad (3)$$

3. INFORMATION GENERATION UNIT

The information generation unit 30 includes at least a noise amount calculation unit and a polarization model estimation unit. The noise amount calculation unit calculates a variance of observation values of the respective plurality of polarization directions acquired by the polarization imaging unit 20. In the present technology, it is regarded that a variance of observation values is generated by noise, and the variance of the observation values, that is, a variance of noise is calculated as an amount of noise. The polarization model estimation unit uses the observation value and the amount of noise calculated by the noise amount calculation unit to estimate a polarization model in which a difference from the observation value acquired by the polarization imaging unit is small, in units of a block that is a set of polarization pixels or in units of a pixel. Specifically, the polarization model estimation unit calculates the amount of noise generated in the image sensor by using the noise variance model on the basis of the polarization image acquired by the polarization imaging unit 20, estimates the polarization model on the basis of the polarization image and the amount of noise, and calculates the parameters A, B, and C of the equation (1). Since the three parameters A, B, and C are calculated, the information generation unit 30 uses observation values in at least three or more polarization directions (the polarization directions may include non-polarization). Furthermore, the information generation unit 30 calculates the parameters by using the observation values in the three or more polarization directions and the variances.

3-1. First Embodiment

Figure 3:
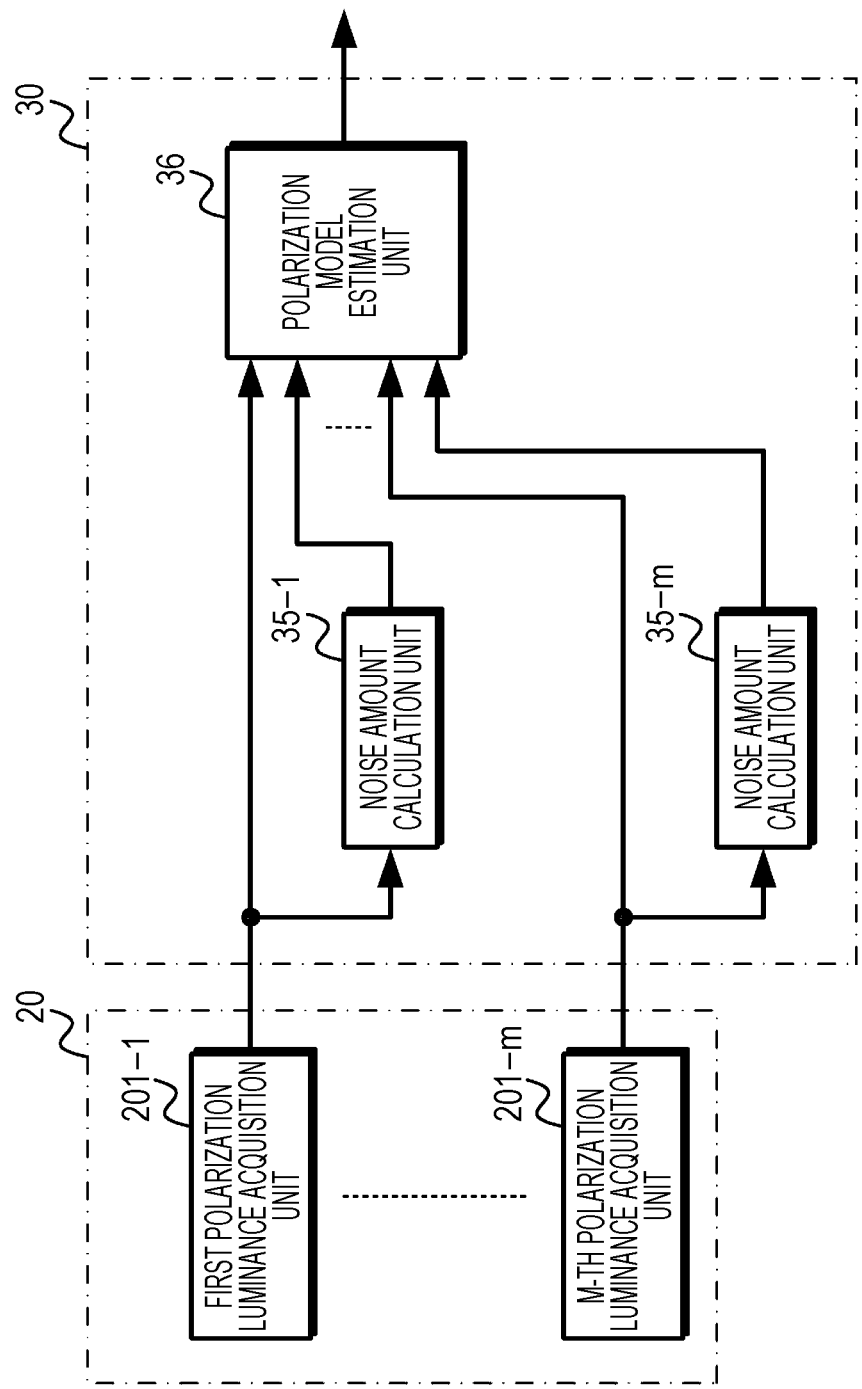
FIG. 3 is a diagram exemplifying a configuration of a first embodiment of an information generation unit.

FIG. 3 exemplifies a configuration of a first embodiment of the information generation unit. The information generation unit 30 includes noise amount calculation units 35-1 to 35-m and a polarization model estimation unit 36. The noise amount calculation units 35-1 to 35-m are respectively provided for a first polarization luminance acquisition unit 201-1 to an m-th polarization luminance acquisition unit 201-m of the polarization imaging unit that generates pixel values used for calculation of the parameters. For example, in a case where the polarization imaging unit 20 has the configuration illustrated in (a) of FIG. 2, and the parameters are calculated by using observation values (luminance values) of four pixels having different polarization directions within a two-dimensional area of 2×2 pixels, the four pixels having different polarization directions correspond to the first polarization luminance acquisition unit 201-1 to the fourth polarization luminance acquisition unit 201-4. Furthermore, in a case where the polarization imaging unit 20 has the configuration illustrated in (b) of FIG. 2, and the parameters are calculated by using observation values in four directions having different polarization directions for each pixel, pixels of respective four rotation positions in which polarization directions of the polarizing plate are different from each other are the first polarization luminance acquisition unit 201-1 to the fourth polarization luminance acquisition unit 201-4.

The noise amount calculation units 35-1 to 35-m each calculate a variance of noise as an amount of noise. The values of the coefficients $c_0$ and $c_1$ of the noise variance model are stored in advance in the noise amount calculation units 35-1 to 35-m, and the noise amount calculation units 35-1 to 35-m each calculate a variance on the basis of the equation (3) with an observation value for each pixel as the average value $i$ and outputs the variance to the polarization model estimation unit 36. Note that, the details of the coefficients $c_0$ and $c_1$ of the noise variance model will be described later.

The polarization model estimation unit 36 uses the observation values (luminance values) acquired by the polarization imaging unit 20 and amounts of noise calculated by the noise amount calculation units 35-1 to 35-$m$ to calculate the parameters A, B, and C of the polarization model so that differences are minimized between the polarization model weighted depending on the amount of noise and the observation values acquired by the polarization imaging unit, for example. Specifically, calculation is performed of an equation (4) using a weighted least squares method, and the parameters A, B, and C are calculated so that a square error is minimized. An equation (5) shows a matrix F used in the equation (4). An equation (6) shows a matrix I used in the equation (4), and the matrix I shows the observation values acquired by the polarization imaging unit 20. Furthermore, an equation (7) shows a matrix W used in the equation (4), diagonal components in the matrix W are reciprocals of the variances, and weighting is performed depending on the reciprocals of the variances. Note that, it is shown that "ET" is a transposed matrix of the matrix F, and $(\ )^{-1}$ is an inverse matrix.

[Expression 2]

$$\begin{bmatrix} A \\ B \\ C \end{bmatrix} = (F^T W F)^{-1} F^T W I \quad (4)$$

$$F = \begin{bmatrix} \sin 2\upsilon_1 & \cos 2\upsilon_1 & 1 \\ \vdots & \vdots & \vdots \\ \sin 2\upsilon_m & \cos 2\upsilon_m & 1 \end{bmatrix} \quad (5)$$

$$I = \begin{bmatrix} i_1 \\ \vdots \\ i_m \end{bmatrix} \quad (6)$$

$$W = \begin{bmatrix} \frac{1}{\sigma^2(i_1)} & 0 & 0 \\ \vdots & \vdots & \vdots \\ 0 & 0 & \frac{1}{\sigma^2(i_m)} \end{bmatrix} \quad (7)$$

Figure 4:
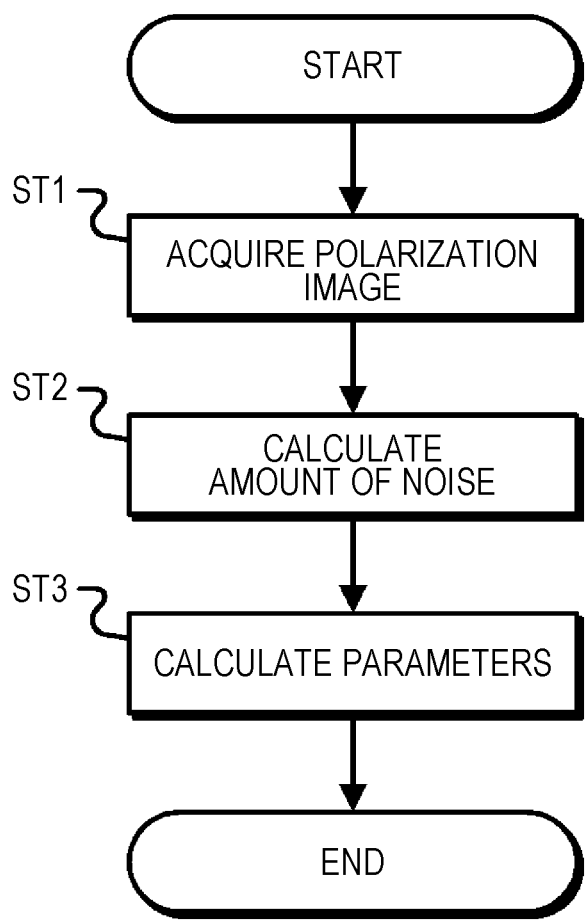
FIG. 4 is a flowchart illustrating operation of the first embodiment.

FIG. 4 is a flowchart illustrating operation of the first embodiment. In step ST1, the information generation unit acquires a polarization image. The information generation unit 30 acquires a polarization image showing observation values in a plurality of polarization directions generated by the polarization imaging unit 20, and proceeds to step ST2.

In step ST2, the information generation unit calculates an amount of noise. The information generation unit 30 calculates amounts of noise on the basis of the equation (3) by using the preset coefficients $c_0$ and $c_1$ and the observation values, and proceeds to step ST3.

In step ST3, the information generation unit calculates parameters. The information generation unit 30 calculates the parameters of the polarization model by, for example, the least squares method by using the observation values of the polarization image acquired in step ST1 and the amounts of noise calculated in step ST2.

As described above, according to the first embodiment, it becomes possible to estimate a polarization model that is robust against noise generated in the image sensor.

3-2. Coefficients of Noise Variance Model

Next, description will be given of the coefficients $c_0$ and $c_1$ used in the noise amount calculation units 35-1 to 35-$m$. The noise variance model estimation unit estimates the noise variance model by using a polarization captured image of a chart having various luminances acquired with the image sensor set in a predetermined drive mode, and calculates the coefficients $c_0$ and $c_1$ of the noise variance model.

Figure 5:
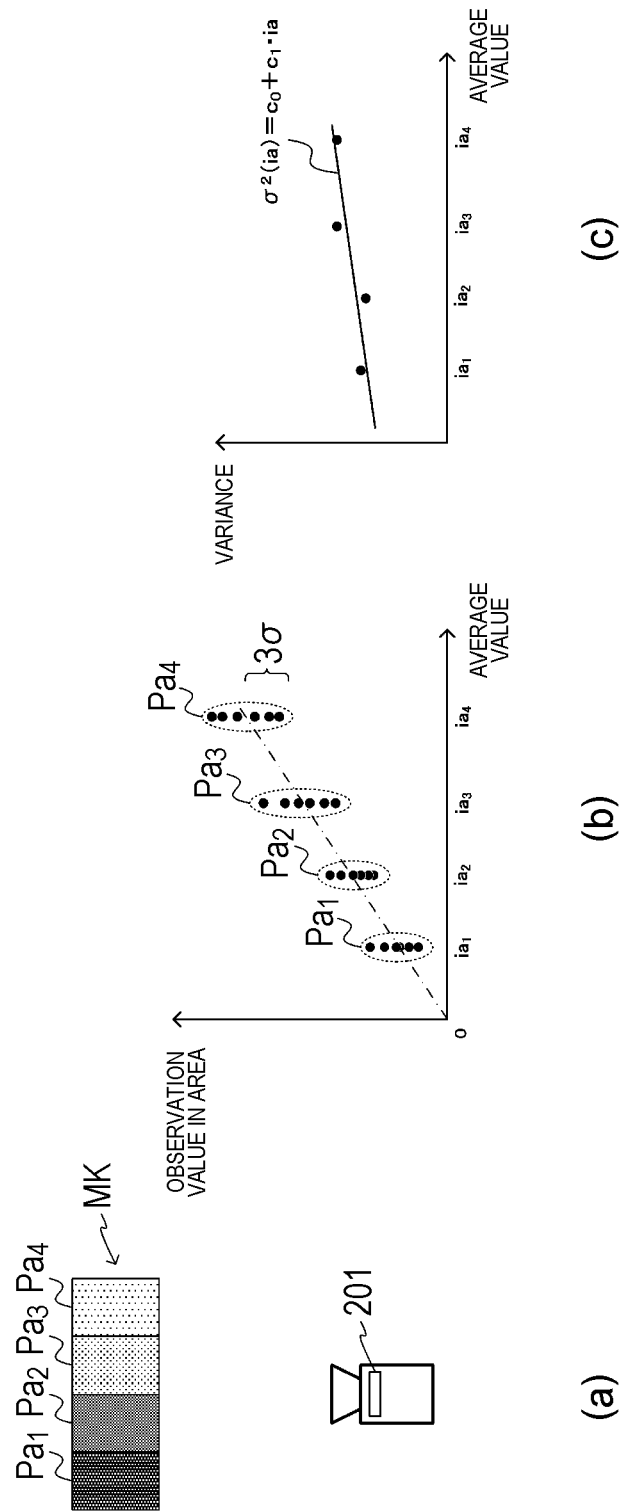
FIG. 5 is a diagram exemplifying observation values for each area that should have the same luminance.

The noise variance model estimation unit measures variation in the observation values from an average observation value of an area that should have the same luminance in the chart and each observation value in the area, for example. FIG. 5 exemplifies observation values for each area that should have the same luminance. A chart MK imaged by the image sensor 201 is exemplified in (a) of FIG. 5, and the chart MK includes, for example, four areas $Pa_1$ to $Pa_4$ having different luminances. The observation values for each area of the chart are illustrated in (b) of FIG. 5, for each of average values $ia_1$ to $ia_4$ of the areas $Pa_1$ to $Pa_4$. In a case where it is assumed that the variation in the observation values due to noise follows a normal distribution, there is a property that about 99% of the variation falls within three times a standard deviation a of the normal distribution when an actual observation value is the center. From this property, it is possible to estimate with what level of standard deviation the observation values vary. The variance is illustrated in (c) of FIG. 5, for each of the average values $ia_1$ to $ia_4$ of the areas $Pa_1$ to $Pa_4$. The noise variance model estimation unit performs a linear regression in which correspondence between the average values $ia_1$ to $ia_4$ of the areas $Pa_1$ to $Pa_4$ and the variances of the areas $Pa_1$ to $Pa_4$ is fitted to a straight line, to calculate the coefficients $c_0$ and $c_1$ of the noise variance model shown in the equation (3).

3-3. Second Embodiment

Figure 6:
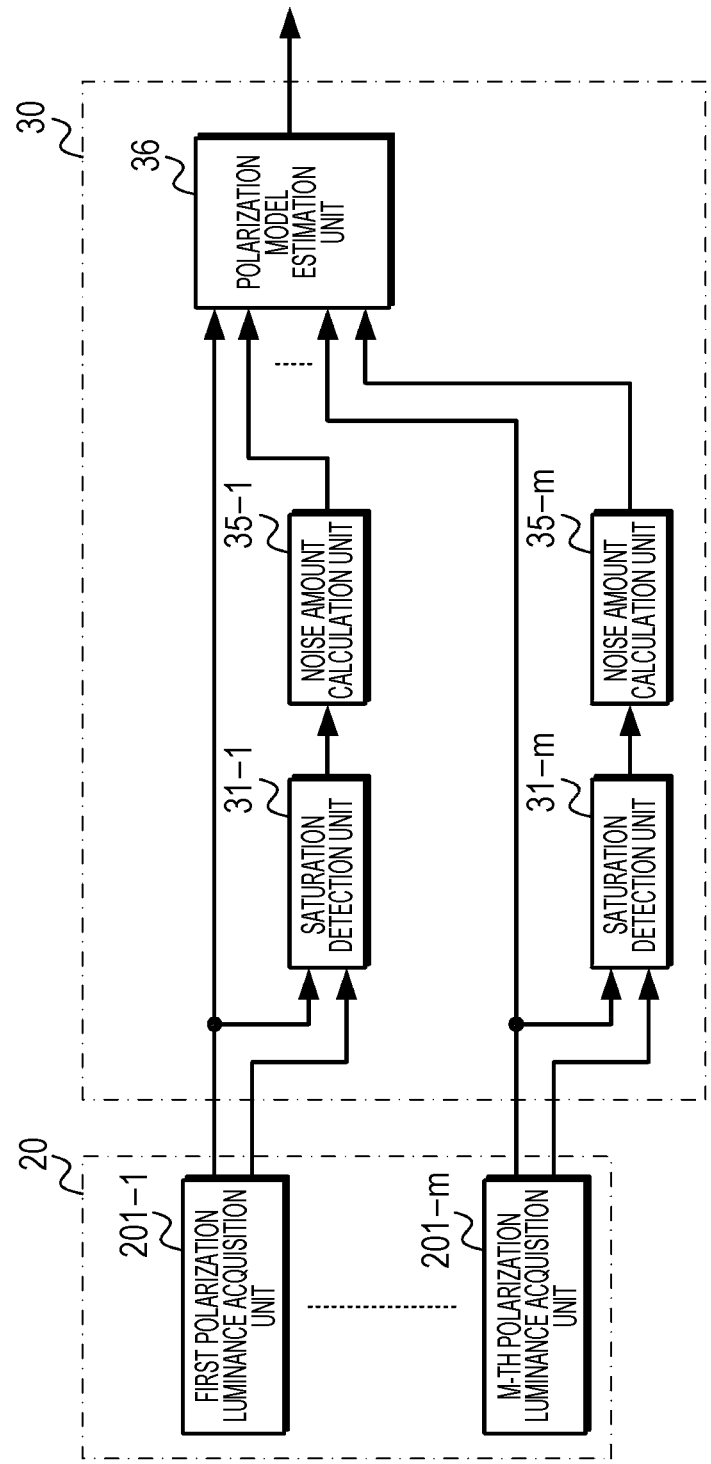
FIG. 6 is a diagram exemplifying a configuration of a second embodiment of the information generation unit.

FIG. 6 exemplifies a configuration of a second embodiment of the information generation unit. The information generation unit 30 has a configuration in which saturation detection units 31-1 to 31-$m$ are further provided to the first embodiment. The saturation detection units 31-1 to 31-$m$ are respectively provided for the first polarization luminance acquisition unit 201-1 to the m-th polarization luminance acquisition unit 201-$m$ of the polarization imaging unit that generates pixel values used for calculation of the parameters, similarly to the noise amount calculation units 35-1 to 35-$m$.

The saturation detection units 31-1 to 31-$m$ each detect an observation value in a saturated state. The saturation detection units 31-1 to 31-$m$ each compare an observation value with the maximum output value of the image sensor and determine an observation value that is the maximum output value as a pixel in the saturated state (referred to as a saturated pixel). The saturation detection unit 31-1 outputs saturated pixel information indicating the detected saturated pixel to the noise amount calculation unit 35-1. Similarly, the saturation detection units 31-2 to 31-$m$ output saturated pixel information indicating the detected saturated pixel to the noise amount calculation units 35-2 to 35-$m$.

The noise amount calculation units 35-1 to 35-$m$ each calculate a variance on the basis of the saturated pixel information and the observation value for each pixel. The noise amount calculation units 35-1 to 35-$m$ each set, for example, a variance of a pixel determined as a saturated pixel in the saturated pixel information to a predetermined value so that the polarization model estimation unit 36 estimates the polarization model by excluding the observation value in the saturated state. Specifically, the variance of the pixel determined as the saturated pixel is set to infinity and the reciprocal of the variance in the matrix W shown in the equation (7) is set to "0", whereby the polarization model is estimated by excluding the observation value in the saturated state.

The polarization model estimation unit 36 uses the observation values (luminance values) acquired by the polarization imaging unit 20 and the amounts of noise calculated by the noise amount calculation units 35-1 to 35-$m$ to perform calculation of the equation (4), and calculates the parameters A, B and C of the polarization model by the least squares method.

Figure 7:
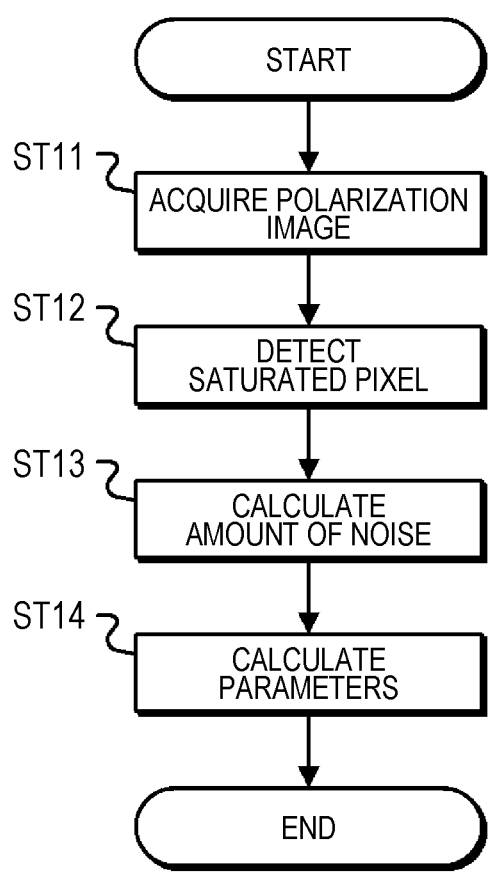
FIG. 7 is a flowchart illustrating operation of the second embodiment.

FIG. 7 is a flowchart illustrating operation of the second embodiment. In step ST11, the information generation unit acquires a polarization image. The information generation unit 30 acquires a polarization image showing observation values in a plurality of polarization directions generated by the polarization imaging unit 20, and proceeds to step ST12.

In step ST12, the information generation unit detects a saturated pixel. The information generation unit 30 sets a pixel whose observation value is the maximum output value of the image sensor as a saturated pixel, and proceeds to step ST13.

In step ST13, the information generation unit calculates an amount of noise. On the basis of the saturated pixel detection result in step ST12, the information generation unit 30 calculates a variance of an unsaturated pixel on the basis of the equation (2) by using the preset coefficients $c_0$ and $c_1$ and the average value i of the observation values, and sets the variance of saturated pixel to infinity. The information generation unit calculates the variances of the saturated pixel and the unsaturated pixel as the amounts of noise, and proceeds to step ST14.

In step ST14, the information generation unit calculates parameters. The information generation unit 30 calculates the parameters of the polarization model by, for example, the least squares method by using the observation values of the polarization image acquired in step ST11 and the amounts of noise calculated in step ST13.

As described above, according to the second embodiment, it becomes possible to estimate a polarization model that is robust against noise generated in the image sensor, similarly to the first embodiment. Moreover, according to the second embodiment, the saturated pixel is excluded in the estimation of the polarization model, so that the polarization model can be estimated accurately.

3-4. Third Embodiment

Next, in a third embodiment, the noise variance model is estimated, whereby processing of calculating the coefficients $c_0$ and $c_1$ in advance is made unnecessary. By detecting a plurality of observation areas from a polarization image acquired by the polarization imaging unit 20, and obtaining a variance from a plurality of observation values and an average observation value of each of the observation areas, the noise variance model is estimated on the basis of a relationship between the average observation value and the variance in the plurality of observation areas.

Figure 8:
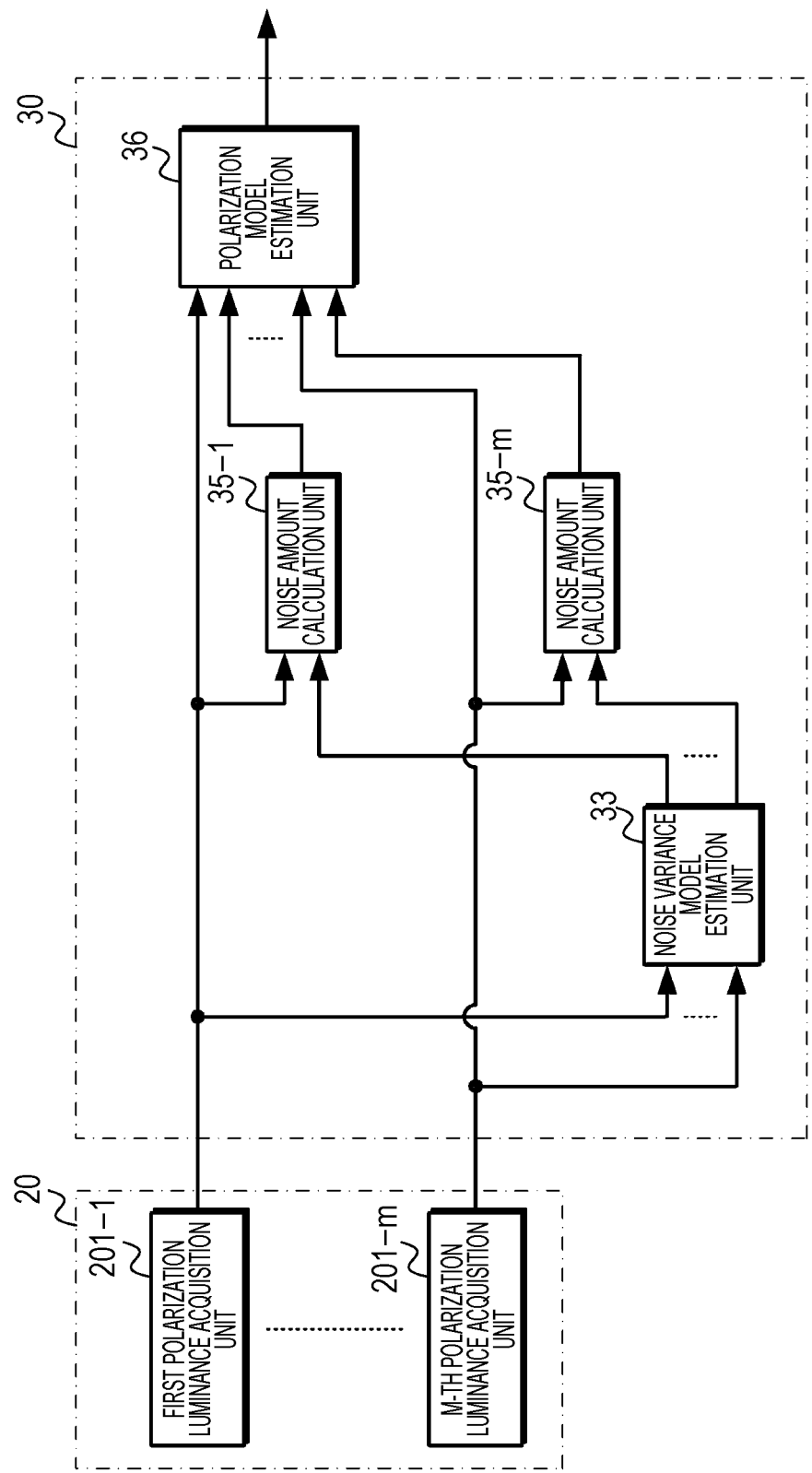
FIG. 8 is a diagram exemplifying a configuration of a third embodiment of the information generation unit.

FIG. 8 exemplifies a configuration of the third embodiment of the information generation unit. The information generation unit 30 includes a noise variance model estimation unit 33, the noise amount calculation units 35-1 to 35-$m$, and the polarization model estimation unit 36. The noise amount calculation units 35-1 to 35-$m$ are respectively provided for the first polarization luminance acquisition unit 201-1 to the m-th polarization luminance acquisition unit 201-$m$ of the polarization imaging unit that generates observation values used for calculation of the parameters.

The noise variance model estimation unit 33 estimates the noise variance model on the basis of the observation values acquired by the first polarization luminance acquisition unit 201-1 to the m-th polarization luminance acquisition unit 201-$m$. On the basis of the observation values acquired by the first polarization luminance acquisition unit 201-1 to the m-th polarization luminance acquisition unit 201-$m$, the noise variance model estimation unit 33 detects a plurality of flat areas without texture (for example, an area in the two-dimensional direction in which a difference between the observation values is within a preset threshold value), and calculates an average value and a variance of the observation values for each of the flat areas. It is assumed that the flat area is, for example, an area in which a difference between the observation values is within a preset threshold value. Moreover, the noise variance model estimation unit 33 performs a linear regression in which correspondence between average values and variances of the plurality of flat areas is fitted to a straight line, to calculate the coefficients $c_0$ and $c_1$ of the noise variance model shown in the equation (3). The noise variance model estimation unit 33 outputs the calculated coefficients $c_0$ and $c_1$ to the noise amount calculation units 35-1 to 35-$m$. Note that, if the noise variance model estimation unit 33 estimates the noise variance model by using the observation values acquired with the image sensor set in different drive modes, a change in the average value is larger than that in the case of one drive mode, and it becomes possible to accurately estimate the noise variance model.

Figure 9:
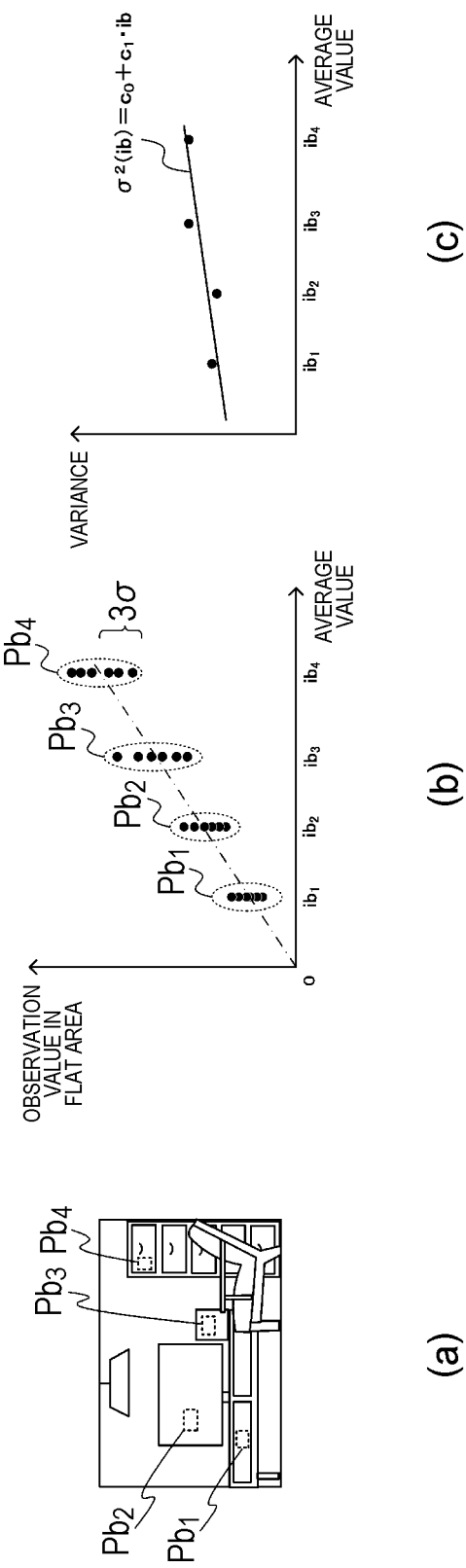
FIG. 9 is a diagram exemplifying operation of a noise variance model estimation unit.

FIG. 9 exemplifies operation of the noise variance model estimation unit in the third embodiment. The noise variance model estimation unit 33 detects flat areas from a polarization image in a plurality of polarization directions. For example, four flat areas $Pb_1$ to $Pb_4$ detected from the polarization image are exemplified in (a) of FIG. 9. The observation values are illustrated in (b) of FIG. 9, for each of average values $ib_1$ to $ib_4$ of the flat areas $Pb_1$ to $Pb_4$. Note that, for the average value of the flat area, if an average value for each of a plurality of drive modes is used, not limited to one drive mode, a distribution of the average value can be widened. The variance is illustrated in (c) of FIG. 9, for each of the average values $ib_1$ to $ib_4$ of the flat areas $Pb_1$ to $Pb_4$. As illustrated in (c) of FIG. 9, the noise variance model estimation unit 33 performs a linear regression in which correspondence between the average values $ib_1$ to $ib_4$ of the flat areas $Pb_1$ to $Pb_4$ and the variances of the flat areas $Pb_1$ to $Pb_4$ is fitted to a straight line, to calculate the coefficients $c_0$ and $c_1$ of the noise variance model shown in the equation (3).

The noise amount calculation units 35-1 to 35-$m$ each calculate a variance of noise as an amount of noise. The noise amount calculation units 35-1 to 35-$m$ each calculate the variance on the basis of the equation (3) by using the coefficients $c_0$ and $c_1$ calculated by the noise variance model estimation unit 33 with the observation value for each pixel as the average value i in the equation (3). The noise amount calculation units 35-1 to 35-$m$ each output the calculated variance as the amount of noise to the polarization model estimation unit 36.

The polarization model estimation unit 36 uses the observation values acquired by the polarization imaging unit 20 and the amounts of noise calculated by the noise amount calculation units 35-1 to 35-$m$ to calculate the parameters A, B, and C of the polarization model by the least squares method similarly to the first embodiment.

Figure 10:
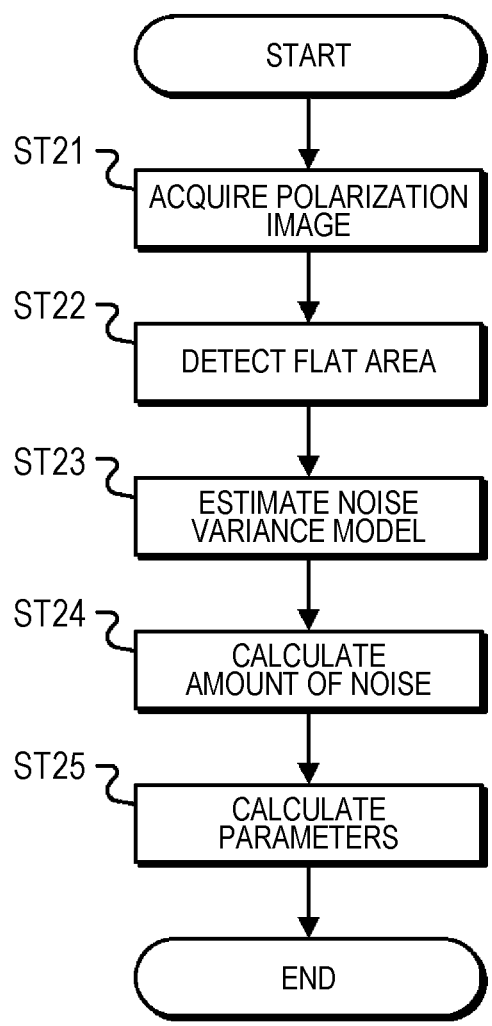
FIG. 10 is a flowchart illustrating operation of the third embodiment.

FIG. 10 is a flowchart illustrating operation of the third embodiment. In step ST21, the information generation unit acquires a polarization image. The information generation unit 30 acquires a polarization image showing observation values in a plurality of polarization directions generated by the polarization imaging unit 20, and proceeds to step ST22.

In step ST22, the information generation unit detects a flat area. The information generation unit 30 detects a plurality of the flat areas without texture from the polarization image and proceeds to step ST23.

In step ST23, the information generation unit estimates the noise variance model. The information generation unit 30 performs a linear regression by calculating an average and a variance of the observation values for each of the plurality of flat areas detected in step ST22, and calculates the coefficients $c_0$ and $c_1$ of the noise variance model shown in the equation (3) and proceeds to step ST24.

In step ST24, the information generation unit calculates an amount of noise. The information generation unit 30 calculates, as amounts of noise, variances on the basis of the equation (3) by using the coefficients $c_0$ and $c_1$ calculated in step ST22 and the observation values, and proceeds to step ST25.

In step ST25, the information generation unit calculates parameters. The information generation unit 30 calculates the parameters of the polarization model by, for example, the least squares method by using the observation values of the polarization image acquired in step ST21 and the amounts of noise calculated in step ST23.

As described above, according to the third embodiment, even if the parameters of the noise variance model are not stored in advance, the noise variance model is estimated, and it becomes possible to estimate a polarization model that is robust against noise generated in the image sensor, similarly to the first embodiment.

3-5. Fourth Embodiment

Next, a fourth embodiment will be described. In the third embodiment, the plurality of flat areas is detected as the plurality of observation areas, and the noise variance model is estimated by using the observation values of the flat areas, but in the fourth embodiment, a plurality of still areas is detected as observation areas on the basis of a plurality of polarization image in the time direction.

The fourth embodiment of the information generation unit is configured similarly to the third embodiment, and the operation of the noise variance model estimation unit 33 is different from that of the third embodiment.

The noise variance model estimation unit 33 estimates the noise variance model on the basis of, for example, observation values for a plurality of frames acquired by the first polarization luminance acquisition unit 201-1 to the m-th polarization luminance acquisition unit 201-*m* and a drive mode of the image sensor. On the basis of, for example, the observation values for the plurality of frames acquired by the first polarization luminance acquisition unit 201-1 to the m-th polarization luminance acquisition unit 201-*m*, the noise variance model estimation unit 33 detects a plurality of still areas that does not move (for example, areas in which a difference in the time direction of observation values at the same position is within a preset threshold value), and calculates an average value and a variance of the observation values for each of the still areas. Moreover, the noise variance model estimation unit 33 performs a linear regression in which correspondence between average values and variances of the plurality of still areas is fitted to a straight line, and calculates the coefficients $c_0$ and $c_1$ of the noise variance model shown in the equation (3). The noise variance model estimation unit 33 outputs the calculated coefficients $c_0$ and $c_1$ to the noise amount calculation units 35-1 to 35-*m*.

Figure 11:
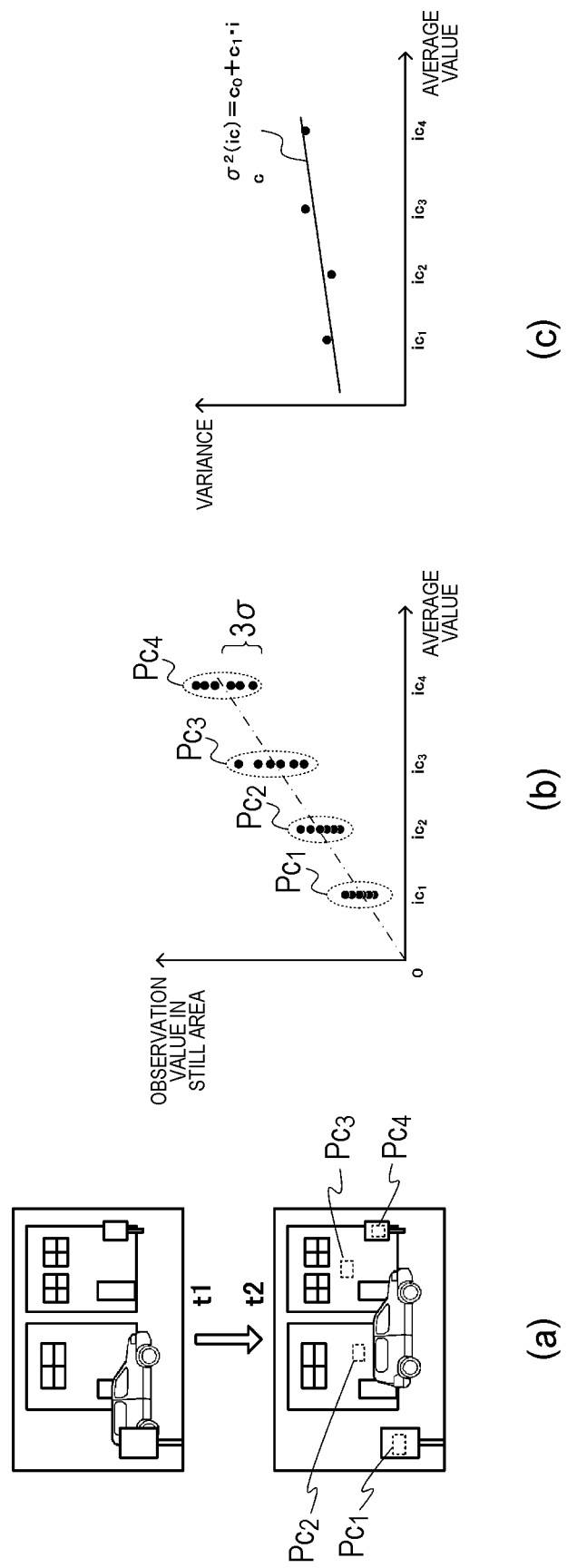
FIG. 11 is a diagram exemplifying operation of a noise variance model estimation unit in a fourth embodiment.

FIG. 11 exemplifies operation of the noise variance model estimation unit in the fourth embodiment. A polarization image group of a plurality of frames is illustrated in (a) of FIG. 11. The noise variance model estimation unit 33 detects a still area from the polarization image group. It is assumed that (a) of FIG. 11 exemplifies the polarization images at time t1 and time t2 and the noise variance model estimation unit 33 detects, for example, four still areas $Pc_1$ to $Pc_4$. The observation values are illustrated in (b) of FIG. 11, for each of average values $ic_1$ to $ic_4$ of the still areas $Pc_1$ to $Pc_4$. The variance is illustrated in (c) of FIG. 11, for each of the average values $ic_1$ to $ic_4$ of the still areas $Pc_1$ to $Pc_4$. As illustrated in (c) of FIG. 11, the noise variance model generation unit 33 performs a linear regression in which correspondence between the average values $ic_1$ to $ic_4$ of the still areas $Pc_1$ to $Pc_4$ and the variances of the still areas $Pc_1$ to $Pc_4$ is fitted to a straight line, and calculates the coefficients $c_0$ and $c_1$ of the noise variance model shown in the equation (3).

The noise amount calculation units 35-1 to 35-*m* each calculate a variance of noise as an amount of noise. The noise amount calculation units 35-1 to 35-*m* each calculate the variance on the basis of the equation (3) by using the coefficients $c_0$ and $c_1$ calculated by the noise variance model estimation unit 33 with the observation value for each pixel as the average value i in the equation (3). The noise amount calculation units 35-1 to 35-*m* each output the calculated variance as the amount of noise to the polarization model estimation unit 36.

The polarization model estimation unit 36 uses the observation values acquired by the polarization imaging unit 20 and the amounts of noise calculated by the noise amount calculation units 35-1 to 35-*m* to calculate the parameters A, B, and C of the polarization model by the least squares method similarly to the first embodiment.

Figure 12:
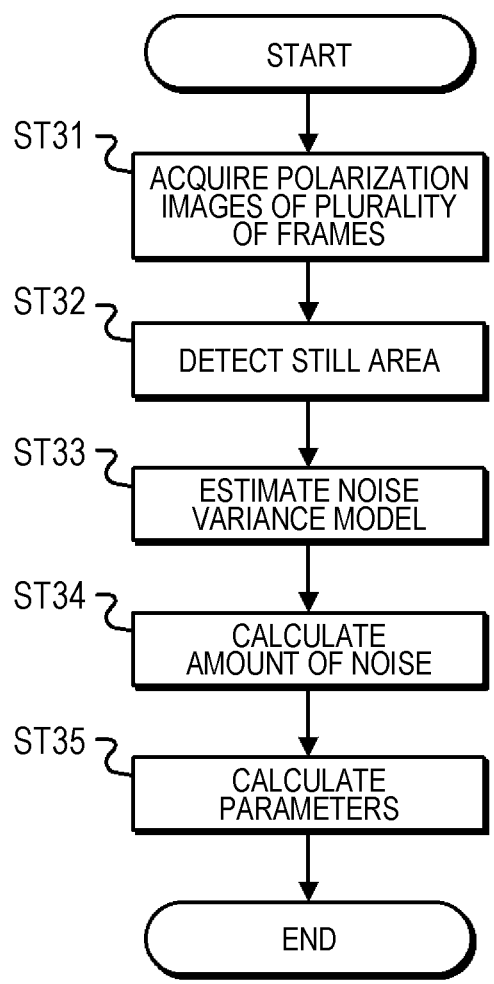
FIG. 12 is a flowchart illustrating operation of the fourth embodiment.

FIG. 12 is a flowchart illustrating operation of the fourth embodiment. In step ST31, the information generation unit acquires polarization images of a plurality of frames. The information generation unit 30 acquires the polarization images of the plurality of frames generated by the polarization imaging unit 20, and proceeds to step ST32.

In step ST32, the information generation unit detects a still area. The information generation unit 30 detects a plurality of the still areas from the polarization images of the plurality of frames acquired in step ST31, and proceeds to step ST33.

In step ST33, the information generation unit estimates the noise variance model. The information generation unit 30 performs a linear regression by calculating an average and a variance of observation values for each of the plurality of still areas detected in step ST32, calculates the coefficients $c_0$, $c_1$ of the noise variance model shown in the equation (3), and proceeds to step ST34.

In step ST34, the information generation unit calculates an amount of noise. The information generation unit 30 calculates, as amounts of noise, variances on the basis of the equation (3) by using the coefficients $c_0$ and $c_1$ calculated in step ST33 and the observation values, and proceeds to step ST35.

In step ST35, the information generation unit calculates parameters. The information generation unit 30 calculates the parameters of the polarization model by, for example, the least squares method by using the observation values of the polarization image acquired in step ST31 and the amounts of noise calculated in step ST33.

As described above, according to the fourth embodiment, even if the parameters of the noise variance model are not stored in advance, the noise variance model is estimated, and it becomes possible to estimate a polarization model that is robust against noise generated in the image sensor, similarly to the third embodiment.

3-6. Fifth Embodiment

Next, in a fifth embodiment, the polarization model is estimated with a higher dynamic range than dynamic ranges of the first to fourth embodiments. The polarization imaging unit 20 of the fifth embodiment acquires polarization images in a plurality of drive modes by switching the drive modes and performing imaging in the plurality of drive modes. The information generation unit 30 estimates the polarization model on the basis of observation values and the sensitivities for the observation values, on the basis of the polarization images in the plurality of modes acquired by the polarization imaging unit 20.

The polarization imaging unit 20 is configured to be able to change the sensitivity or the exposure time, and acquires a polarization image every time the sensitivity or the exposure time is changed. In a case where the polarization imaging unit 20 has the configuration illustrated in (a) of FIG. 2, for example, imaging may be performed in a plurality of different drive modes to acquire a plurality of polarization images, or the exposure time may be made changeable for each pixel to acquire a polarization image including a plurality of observation values of different exposure times in one imaging. Furthermore, by providing a neutral density filter having a different amount of attenuation of light for each pixel, a polarization image including a plurality of observation values at different sensitivities may be acquired by one imaging. Furthermore, in a case where the polarization imaging unit 20 has the configuration illustrated in (b) of FIG. 2, for example, operation of acquiring a polarization image with the polarization directions of the polarizing plate set in a desired plurality of directions is performed in the plurality of different drive modes. Note that, the polarization imaging unit 20 is only required to acquire a plurality of polarization images having different sensitivities or exposure times, and is not limited to the configuration described above.

Figure 13:
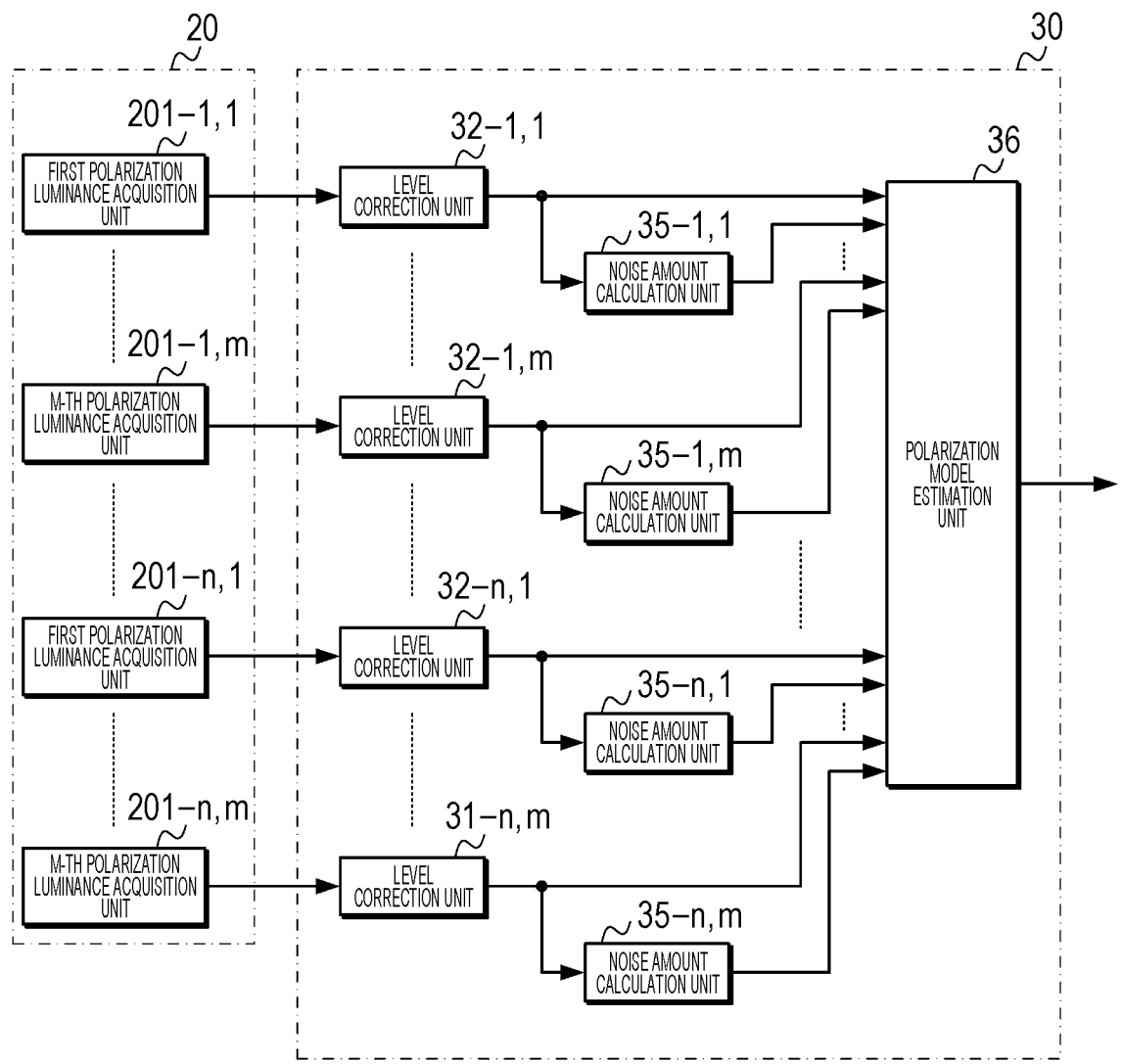
FIG. 13 is a diagram exemplifying a configuration of a fifth embodiment of the information generation unit.

FIG. 13 exemplifies a configuration of the fifth embodiment of the information generation unit. Note that, FIG. 13 illustrates a case where a pixel group for acquiring observation values in m types of polarization directions is provided for each of n types of drive modes as the polarization imaging unit 20, and observation values are acquired in a first polarization direction u1 to an m-th polarization direction um for each of a first drive mode to an n-th drive mode. Furthermore, an observation value in the first polarization direction in the first drive mode is "$i_{1,1}$", an observation value in the second polarization direction in the first drive mode is "$i_{1,2}$" . . . an observation value in the m-th polarization direction in the n-th drive mode is "$i_{n,m}$".

The information generation unit 30 includes level correction units 32-1,1 to 32-1,m, . . . , 32-n,1 to 32-n,m, noise amount calculation units 35-1,1 to 35-1,m, . . . , 35-n,1 to 35-n, m, and the polarization model estimation unit 36.

The level correction units 32-1,1 to 32-1,m, . . . , 32-n,1 to 32-n,m each perform level correction of making the observation value for each of the plurality of polarization directions acquired for each of a plurality of operation modes uniform. For example, the level correction unit 32-1,1 corrects the observation value with a gain depending on the sensitivity and the exposure time of the acquired polarization image, and outputs the corrected observation value to the noise amount calculation unit 35-1,1 and the polarization model estimation unit 36. Similarly, the level correction units 32-2,1 to 32-2,m, . . . , 32-n,1 to 32-n,m correct the observation values with gains depending on the sensitivities and exposure times of the acquired polarization images, and output the corrected observation values to the noise amount calculation units 35-2,1 to 35-2,m, . . . , 35-n,1 to 35-n,m, and the polarization model estimation unit 36. The level correction units 32-1,1 to 32-1,m, . . . , 32-n,1 to 32-n,m set the gains so that the observation values are equal to each other for each polarization direction regardless of the sensitivity or exposure time.

Figure 14:
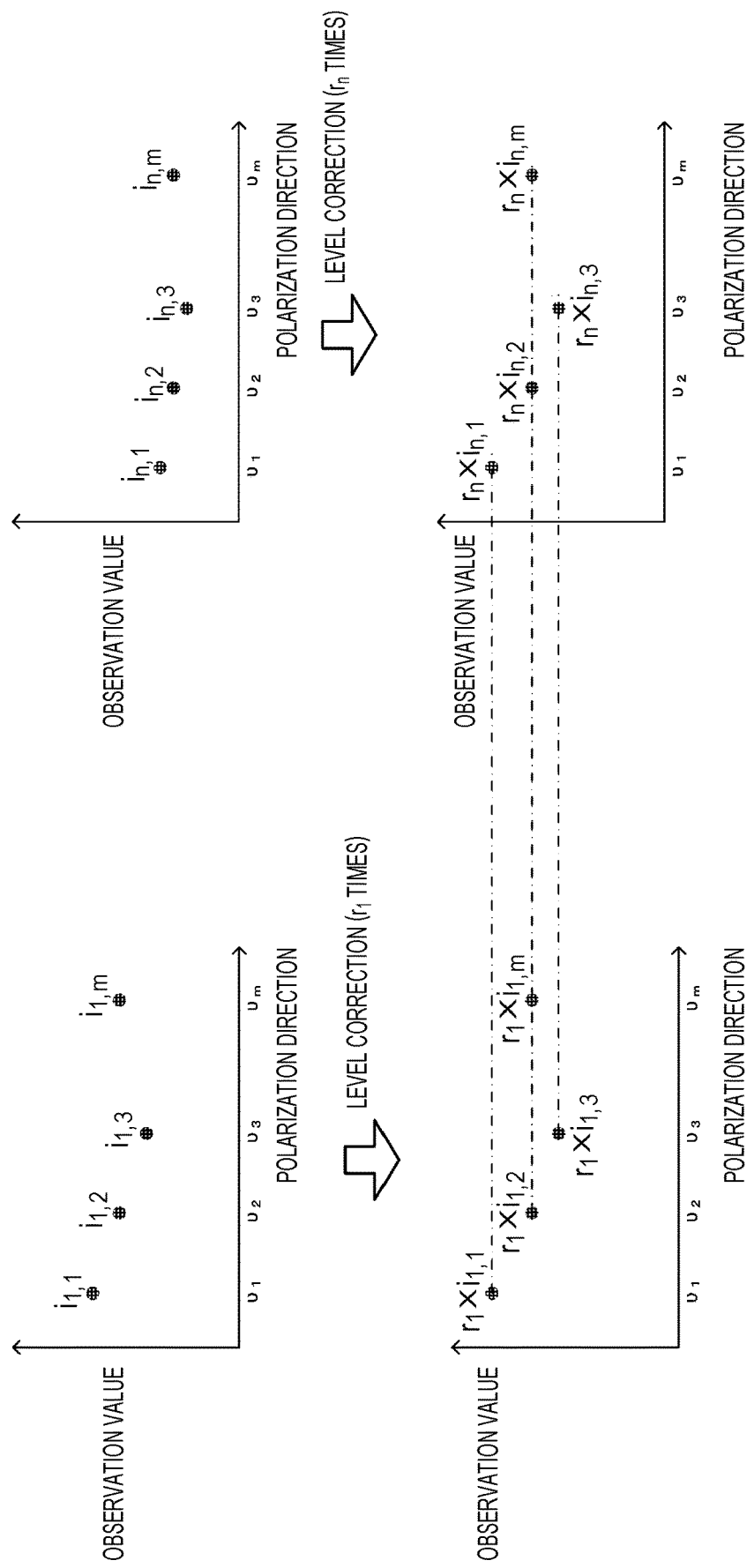
FIG. 14 is a diagram exemplifying operation of a level correction unit.

FIG. 14 exemplifies operation of the level correction units, and, note that, FIG. 14 illustrates the operation of the level correction units 32-1,1 to 32-1,m, and 32-n,1 to 32-n,m, for example, in a case where the number of polarization directions is m. For example, the level correction unit 32-1,1 multiplies the observation value "$i_{1,1}$" in the polarization direction u1 acquired by the polarization luminance acquisition unit of a first sensitivity in the polarization imaging unit 20 by $r_1$. Similarly, the level correction units 32-1,2 to 32-1,m multiply the observation values "$i_{1,2}$, $i_{1,3}$, . . . , $i_{1,m}$" in the polarization directions u2 to um acquired by the polarization luminance acquisition unit of the first sensitivity by $r_1$. Furthermore, the level correction unit 32-n,1 multiplies the observation value "$i_{n,1}$" in the polarization direction u1 acquired by the polarization luminance acquisition unit of an n-th sensitivity in the polarization imaging unit 20 by $r_n$. Similarly, the level correction units 32-n,2 to 32-n,m multiply the observation values "$i_{n,2}$, $i_{n,3}$, . . . , $i_{n,m}$" in the polarization directions u2 to um acquired by the polarization luminance acquisition unit of the n-th sensitivity by $r_n$. Thus, the observation values after the level correction are "$r_1 \times i_{1,1} = r_n \times i_{n,1}$", "$r_1 \times i_{1,2} = r_n \times i_{n,2}$", "$r_1 \times i_{1,3} = r_n \times i_{n,3}$", . . . "$r_1 \times i_{1,m} = r_n \times i_{n,m}$".

The noise amount calculation units 35-1,1 to 35-1,m, . . . , 35-n,1 to 35-n,m each calculate a variance of noise as an amount of noise. In a case where the observation value i is corrected to an observation value "$r \times i$", the noise amount calculation units 35-1,1 to 35-1,m, . . . , 35-n,1 to 35-n,m set the variance to "$r^2 \times \sigma^2(i)$". The noise amount calculation units 35-1,1 to 35-1,m, . . . , 35-n,1 to 35-n, m output the calculated variances as the amounts of noise to the polarization model estimation unit 36.

The polarization model estimation unit 36 uses the observation values after the level correction of the observation values acquired by the polarization imaging unit 20, and the amounts of noise calculated by the noise amount calculation units 35-1,1 to 35-1,m, . . . , 35-n,1 to 35-n,m to calculate the parameters A, B, and C of the polarization model on the basis of an equation (8). An equation (9) shows a matrix F used in the equation (8). An equation (10) shows a matrix I used in the equation (8), and the matrix I shows the observation values acquired by the polarization imaging unit 20. Furthermore, an equation (11) shows a matrix W used in the equation (8), and the matrix W is a diagonal matrix showing the reciprocal of the variance.

[Expression 3]

$$\begin{bmatrix} A \\ B \\ C \end{bmatrix} = (F^T W F)^{-1} F^T W I \quad (8)$$

$$F = \begin{bmatrix} \sin 2\upsilon_1 & \cos 2\upsilon_1 & 1 \\ \vdots & \vdots & \vdots \\ \sin 2\upsilon_m & \cos 2\upsilon_m & 1 \\ & \vdots & \\ \sin 2\upsilon_1 & \cos 2\upsilon_1 & 1 \\ \vdots & \vdots & \vdots \\ \sin 2\upsilon_m & \cos 2\upsilon_m & 1 \end{bmatrix} \quad (9)$$

$$I = \begin{bmatrix} r_1 i_{1,1} \\ \vdots \\ r_1 i_{1,m} \\ \vdots \\ r_n i_{n,1} \\ \vdots \\ r_n i_{n,m} \end{bmatrix} \quad (10)$$

$$W = \text{diag}\left(\frac{1}{r_1^2 \cdot \sigma^2(i_{1,1})}, \cdots, \frac{1}{r_1^2 \cdot \sigma^2(i_{1,m})}, \cdots, \frac{1}{r_n^2 \cdot \sigma^2(i_{n,1})}, \cdots, \frac{1}{r_n^2 \cdot \sigma^2(i_{n,1m})}\right) \quad (11)$$

Figure 15:
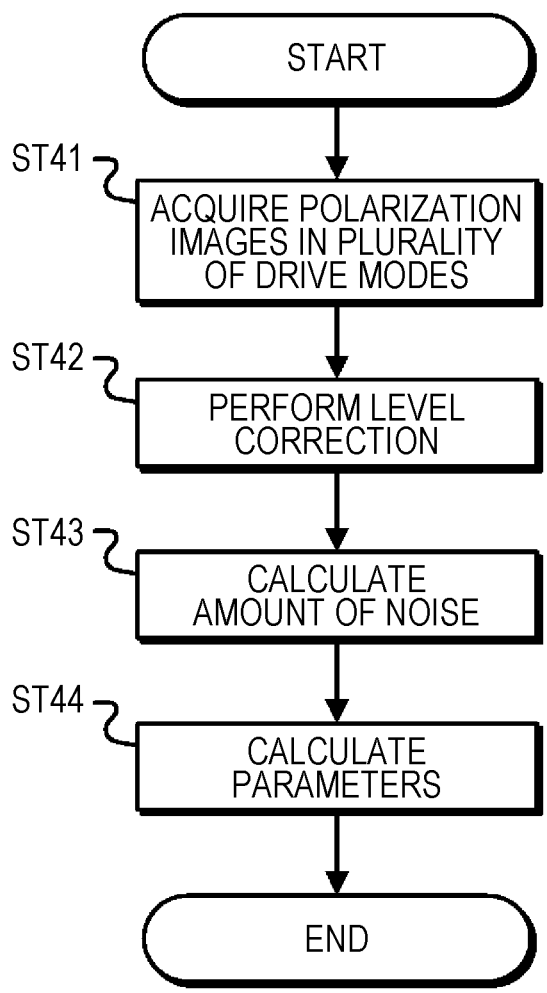
FIG. 15 is a flowchart illustrating operation of the fifth embodiment.

FIG. 15 is a flowchart illustrating operation of the fifth embodiment. In step ST41, the information generation unit acquires polarization images in a plurality of drive modes. The information generation unit 30 acquires the polarization images in the plurality of drive modes generated by the polarization imaging unit 20, and proceeds to step ST42.

In step ST42, the information generation unit performs level correction. The information generation unit 30 performs the level correction of the polarization images acquired in step ST41, performs the level correction so that the observation values of the polarization images in the plurality of drive modes are equal to each other at the same pixel position, and proceeds to step ST43.

In step ST43, the information generation unit calculates an amount of noise. The information generation unit 30 calculates, as amounts of noise, variances of noise on the basis of the equation (3) by using the preset coefficients cc and $c_1$ and the observation values corrected in step ST42, and proceeds to step ST44.

In step ST44, the information generation unit calculates parameters. The information generation unit 30 calculates the parameters of the polarization model by, for example, the least squares method by using the observation values corrected in step ST42 and the amounts of noise calculated in step ST43.

As described above, according to the fifth embodiment, it is possible to estimate a polarization model having a high dynamic range and in which noise is suppressed most, from polarization images acquired in the plurality of different drive modes.

3-7. Sixth Embodiment

Next, in a sixth embodiment, the polarization model is estimated with a higher dynamic range than dynamic ranges of the first to fourth embodiments without using a saturated pixel. The polarization imaging unit 20 of the sixth embodiment acquires polarization images in a plurality of drive modes by switching the drive modes and performing imaging in the plurality of drive modes. The information generation unit 30 estimates the polarization model without using the saturated pixel on the basis of the polarization images for the respective plurality of drive modes acquired by the polarization imaging unit 20.

The polarization imaging unit 20 is configured to be able to change the sensitivity or the exposure time similarly to the fifth embodiment, acquires a polarization image every time the sensitivity or the exposure time is changed, and outputs the acquired polarization image to the information generation unit 30.

Figure 16:
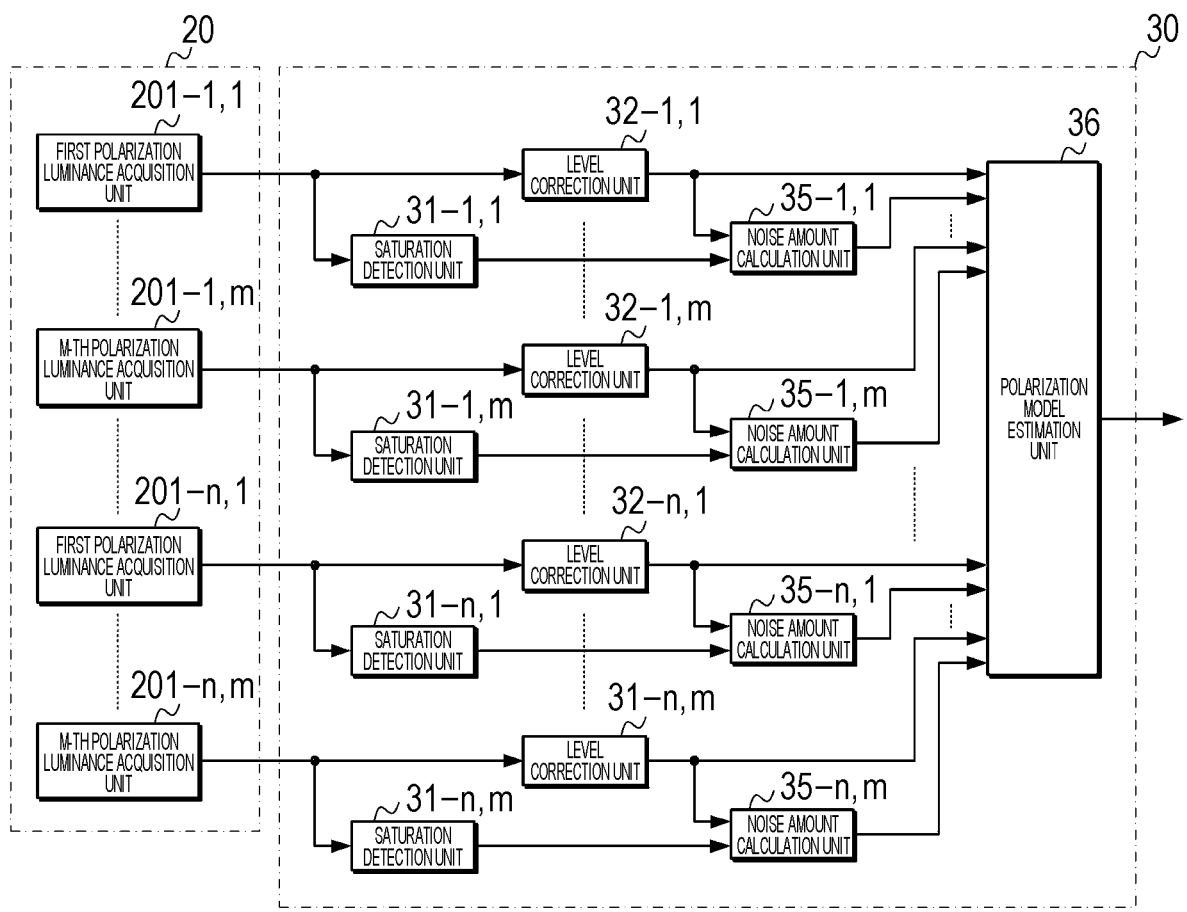
FIG. 16 is a diagram exemplifying a configuration of a sixth embodiment of the information generation unit.

FIG. 16 exemplifies a configuration of the sixth embodiment of the information generation unit. Note that, a case is illustrated where the polarization imaging unit 20 acquires observation values in the first polarization direction u1 to the m-th polarization direction um in each of the first drive mode to the n-th drive mode. Furthermore, an observation value in the first polarization direction in the first drive mode is "$i_{1,1}$", an observation value in the second polarization direction in the first drive mode is "$i_{1,2}$" . . . an observation value in the m-th polarization direction in the n-th drive mode is "$i_{n,m}$".

The information generation unit 30 includes saturation detection units 31-1,1 to 31-1,m, . . . , 31-n,1 to 31-n,m, the level correction units 32-1,1 to 32-1, m, . . . , 32-n,1 to 32-n,m, the noise amount calculation units 35-1,1 to 35-1,m, . . . , 35-n,1 to 35-n,m, and the polarization model estimation unit 36.

The saturation detection unit 31-1,1 determines whether or not the observation value in the first polarization direction is in the saturated state in the first drive mode, and outputs the determination result to the noise amount calculation unit 35-1,1. The saturation detection units 31-1,2 determines whether or not the observation value in the second polarization direction is in the saturated state in the first drive mode, and outputs the determination result to the noise amount calculation unit 35-1,2. The saturation detection units 31-1,3 to 31-1,m, . . . , 31-n,1 to 31-n,m also perform determination of the saturated pixel similarly, and output the determination results to the noise amount calculation units 35-1,3 to 35-1,m, . . . ,35-n,1 to 35-n,m.

The level correction unit 32-1,1 corrects the observation value with a gain depending on the sensitivity and the exposure time of the acquired polarization image, and outputs the corrected observation value to the noise amount calculation unit 35-1,1 and the polarization model estimation unit 36. Similarly, the level correction units 32-1,2 to 32-1,m, . . . , 32-n,1 to 32-n,m also correct the observation values with gains depending on the sensitivities and the exposure times of the acquired polarization images similarly, and output the corrected observation values to the noise amount calculation units 35-1,2 to 35-1,m, . . . , 35-n,1 to 35-n,m and the polarization model estimation unit 36. The level correction units 32-1,1 to 32-1,m, . . . , 32-n,1 to 32-n,m set the gains so that the observation values are equal to each other for each polarization direction regardless of the sensitivity or exposure time.

The noise amount calculation units 35-1,1 to 35-1,m, . . . , 35-n,1 to 35-n,m each calculate a variance of noise as an amount of noise. In a case where the observation value i is corrected to the observation value r×i, the noise amount calculation units 35-1,1 to 35-1,m, . . . , 35-n,1 to 35-n,m set the variance to "$r^2 \times \sigma^2(i)$". Furthermore, the noise amount calculation unit 35-1,1 sets the variance to infinity in a case where the pixel is determined as a saturated pixel by the saturation detection unit 31-1,1. Similarly, the noise amount calculation units 35-1,2 to 35-1,m, . . . , 35-n,1 to 35-n,m set the variance to infinity in a case where the pixel is determined as a saturated pixel by the saturation detection units 31-1,2 to 31-1,m, . . . , 31-n,1 to 31-n,m. The noise amount calculation units 35-1,1 to 35-1,$m$, ..., 35-$n$,1 to 35-$n$, $m$ output the calculated variances as the amounts of noise to the polarization model estimation unit 36.

The polarization model estimation unit 36 uses the observation values after the level correction of the observation values acquired by the polarization imaging unit 20, and the amounts of noise calculated by the noise amount calculation units 35-1,1 to 35-1,$m$, ..., 35-$n$,1 to 35-$n$,$m$ to calculate the parameters A, B, and C of the polarization model.

Figure 17:
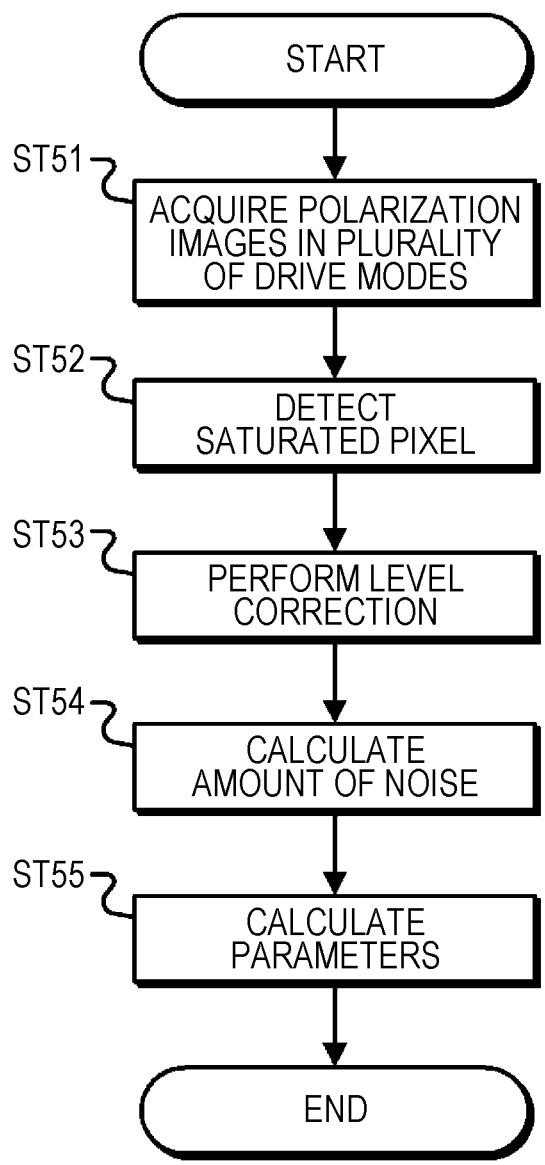
FIG. 17 is a flowchart illustrating operation of the sixth embodiment.

FIG. 17 is a flowchart illustrating operation of the sixth embodiment. In step ST51, the information generation unit acquires polarization images in a plurality of drive modes. The information generation unit 30 acquires the polarization images in the plurality of drive modes generated by the polarization imaging unit 20, and proceeds to step ST52.

In step ST52, the information generation unit detects a saturated pixel. The information generation unit 30 sets a pixel whose observation value is the maximum output value of the image sensor as a saturated pixel, and proceeds to step ST53.

In step ST53, the information generation unit performs level correction. The information generation unit 30 performs the level correction of the polarization images acquired in step ST51, performs the level correction so that the observation values of the polarization images in the plurality of drive modes are equal to each other at the same pixel position, and proceeds to step ST54.

In step ST54, the information generation unit calculates an amount of noise. The information generation unit 30 calculates, as amounts of noise, variances on the basis of the equation (3) by using the preset coefficients $c_0$ and $c_1$ and the observation values corrected in step ST53. Furthermore, the information generation unit 30 sets the variance of the saturated pixel detected in step ST52 to infinity and proceeds to step ST55.

In step ST55, the information generation unit calculates parameters. The information generation unit 30 calculates the parameters of the polarization model by, for example, the least squares method by using the observation values corrected in step ST53 and the amounts of noise calculated in step ST54.

As described above, according to the sixth embodiment, it is possible to estimate a polarization model having a high dynamic range and in which noise is suppressed most, from the polarization images acquired in the plurality of different drive modes, similarly to the fifth embodiment. Moreover, according to the sixth embodiment, the saturated pixel is excluded in the estimation of the polarization model, so that the polarization model can be estimated accurately. Note that, in a case where the gain of the level correction unit is high and the corrected observation value is in the saturated state, the pixel in the saturated state may be excluded as a saturated pixel in the estimation of the polarization model.

3-8. Other Embodiments

The polarization imaging unit 20 and the information processing unit 30 are not limited to being provided individually, and the polarization imaging unit 20 and the information processing unit 30 may be integrally configured, and one of the polarization imaging unit 20 and the information processing unit 30 may be included in the other.

Furthermore, in the embodiments described above, the case has been described where the coefficients $c_0$ and $c_1$ of the noise variance model are stored in advance in the noise amount calculation unit, or where the noise variance model estimation unit calculates the coefficients $c_0$ and $c_1$ of the noise variance model; however, the information generation unit 30 may acquire the coefficients $c_0$ and $c_1$ of the noise variance model from the polarization imaging unit 20. For example, in a case where the polarization imaging unit 20 and the information processing unit 30 are provided individually, the noise variance model is estimated when the polarization imaging unit 20 is manufactured, and the coefficients $c_0$ and $c_1$ are stored. Furthermore, the polarization imaging unit 20 outputs the coefficients $c_0$ and $c_1$ of the noise variance model as attached information when outputting the observation value. When estimating a normal model from the observation value, the information generation unit 30 calculates the amount of noise by using the coefficients $c_0$ and $c_1$ of the noise variance model indicated as the attached information of the observation value. If such a configuration is used, it becomes possible to easily estimate a normal model that is robust against noise even in a case where different polarization imaging units 20 are switched and used.

Furthermore, in the fifth embodiment, the level correction unit and the noise amount calculation unit are provided for each drive mode and each polarization direction, and in the sixth embodiment, the saturation detection unit, the level correction unit, and the noise amount calculation unit are provided for each drive mode and each polarization direction; however, for example, in a case where a polarization image is acquired by performing imaging a plurality of times while changing the drive modes, the level correction unit, the noise amount calculation unit, and the saturation detection unit for each polarization direction may be provided for only one drive mode to perform processing for each drive mode sequentially, and the polarization model estimation unit may estimate the normal model by using the observation value and the amount of noise of each drive mode. If such a configuration is used, the information generation unit can be simply configured.

4. INFORMATION OBTAINED FROM POLARIZATION MODEL

Next, information obtained from the polarization model will be exemplified. The polarization model equation shown in the equation (1) becomes an equation (12) when the coordinate system is changed. A degree of polarization ρ in the equation (12) is calculated on the basis of an equation (13), and an azimuth angle φ is calculated on the basis of an equation (14). Note that, the degree of polarization ρ indicates an amplitude of the polarization model equation, and the azimuth angle φ indicates the phase of the polarization model equation.

[Expression 4]

$$I(\upsilon) = C \cdot (1 + \rho \cdot \cos(2(\upsilon - \phi))) \quad (12)$$

$$\rho = \frac{\sqrt{A^2 + B^2}}{C} \quad (13)$$

$$\phi = \frac{1}{2}\tan^{-1}\left(\frac{A}{B}\right) \quad (14)$$

It is known that a zenith angle θ can be calculated if the degree of polarization and a refractive index of a subject are clear (for example, WO 2016/088483 A). Thus, normal line information indicating the azimuth angle φ and the zenith angle θ can be generated by using the polarization model equation. Furthermore, the parameter C indicates the average of the observation values, and the degree of polarization ρ indicates the amplitude of the polarization model equation. Thus, a diffuse reflection component can be calculated by subtracting the maximum amplitude from the average value. Moreover, a specular reflection component can be calculated by subtracting the diffuse reflection component from the observation value. That is, by estimating a polarization model that is robust against noise by using the technology according to the present disclosure, it is possible to generate normal line information that is robust against noise and calculate the reflection components, so that, for example, it is possible to obtain a reflection reduced image with a higher S/N ratio than before, and estimate a surface direction of the subject with higher accuracy than before. Moreover, it is possible to obtain an arbitrary polarization direction image (pseudo PL filter image) having a higher S/N ratio than before.

5. APPLICATION EXAMPLES

The technology according to the present disclosure can be applied to various fields. The present technology may be applied to a device mounted on any type of mobile body, for example, a car, an electric car, a hybrid electric car, a motorcycle, a bicycle, a personal mobility, an airplane, a drone, a ship, a robot, or the like. Furthermore, the present technology may be applied to an apparatus mounted on a device used in a production process in a factory or a device used in the construction field. When the present technology is applied to such a field, by generating, for example, normal line information on the basis of the estimated polarization model, a surrounding environment can be accurately grasped in three dimensions, and fatigue of drivers or workers can be reduced. Furthermore, it becomes possible to perform automatic driving and the like more safely.

The technology according to the present disclosure can also be applied to the medical field. For example, if normal line information is generated, a specular reflection component is removed, or the like on the basis of the estimated polarization model, a three-dimensional shape of a surgical site or an image without reflection can be obtained accurately, and it becomes possible to reduce surgeon's fatigue, and perform surgery safely and more reliably. Furthermore, the technology according to the present disclosure can be applied to fields such as public services. For example, when an image of a subject is published in a book, magazine, or the like, it is possible to accurately remove an unnecessary reflection component and the like from the image of the subject on the basis of the estimated polarization model.

The series of processing steps described in the specification can be executed by hardware, software, or a combination of both. In a case where processing by software is executed, a program recording a processing sequence is installed in a memory in a computer incorporated in dedicated hardware and executed. Alternatively, the program can be installed and executed in a general-purpose computer capable of executing various types of processing.

For example, the program can be recorded in advance in Read Only Memory (ROM), a Solid State Drive (SSD) or a hard disk as a recording medium. Alternatively, the program can be temporarily or permanently stored (recorded) in a removable recording medium such as a flexible disk, compact disc read only memory (CD-ROM), magneto optical (MO) disk, digital versatile disc (DVD), Blu-ray Disc (registered trademark) (BD), magnetic disk, or semiconductor memory card. Such a removable recording medium can be provided as so-called packaged software.

Furthermore, the program may be transferred wirelessly or by wire to the computer from a download site through the network such as a local area network (LAN) or the Internet, besides being installed from the removable recording medium to the computer. The computer can receive the program transmitted in that way, and install the program in the recording medium such as a built-in hard disk.

Note that, the advantageous effects described in this specification are merely exemplifications, and the advantageous effects of the present technology are not limited to them and may include additional effects that are not described herein. Furthermore, the present technology should not be interpreted to be limited to the embodiments of the technology described above. The embodiments of this technology disclose the present technology through exemplifications, and it should be obvious that those skilled in the art can modify or replace those embodiments with other embodiments without departing from the scope of the present technology. In other words, the claims should be taken into account in understanding the subject matter of the present technology.

Furthermore, the information generation device of the present technology can also have the following configuration.

(1) An information generation device including:
  a noise amount calculation unit that calculates an amount of noise on the basis of an observation value for each of a plurality of polarization directions; and
  a polarization model estimation unit that estimates a polarization model by using the observation value and the amount of noise calculated by the noise amount calculation unit.

(2) The information generation device according to (1), in which the noise amount calculation unit calculates the amount of noise by using a noise variance model showing a relationship between the observation value and a variance.

(3) The information generation device according to (2), in which the noise amount calculation unit sets a variance depending on the observation value as the amount of noise.

(4) The information generation device according to any of (2) to (3), in which the noise variance model is stored in advance in the noise amount calculation unit.

(5) The information generation device according to any of (2) to (3), further including
  a noise variance model estimation unit that detects a plurality of observation areas from a captured image, obtains a variance from a plurality of observation values and an average observation value in each of the observation areas, and estimates a noise variance model from average observation values and variances in the plurality of observation areas, in which
  the noise amount calculation unit calculates the amount of noise by using the noise variance model estimated by the noise variance model estimation unit.

(6) The information generation device according to (5), in which the noise variance model estimation unit sets a flat area in the captured image as the observation area.

(7) The information generation device according to (5), in which the noise variance model estimation unit sets a still area in the captured image as the observation area.

(8) The information generation device according to any of (1) to (7), further including
  a saturation detection unit that detects an observation value in a saturated state, in which
  the polarization model estimation unit excludes the observation value in the saturated state and then estimates the polarization model.

(9) The information generation device according to (8), in which
the noise amount calculation unit sets a predetermined value as an amount of noise of the observation value in the saturated state in the saturation detection unit, and
the polarization model estimation unit excludes the observation value in the saturated state due to that the amount of noise is set to the predetermined value and then estimates the polarization model.

(10) The information generation device according to any of (1) to (9), further including
a level correction unit that performs level correction of making the observation value for each of the plurality of polarization directions acquired for each of a plurality of drive modes uniform, in which
the noise amount calculation unit calculates the amount of noise by using the observation value corrected by the level correction unit, a correction gain used in the level correction, and the noise variance model, and
the polarization model estimation unit estimates the polarization model by using the observation value corrected by the level correction unit and the amount of noise calculated by the noise amount calculation unit.

(11) The information generation device according to (10), in which the plurality of drive modes is drive modes having different sensitivities or exposure times.

(12) The information generation device according to any of (1) to (11), in which the observation value for each of the plurality of polarization directions is an observation value in which the polarization directions are three or more directions.

(13) The information generation device according to any of (1) to (12), further including a polarization imaging unit that acquires the observation value for each of the plurality of polarization directions.

(14) The information generation device according to (13), in which
the polarization imaging unit stores a noise variance model, and
the noise amount calculation unit calculates the amount of noise by using the noise variance model stored in the polarization imaging unit.

INDUSTRIAL APPLICABILITY

In the information generation device, the information generation method, and the program of this technology, the amounts of noise are calculated on the basis of the observation values for the respective plurality of polarization directions, and the polarization model is estimated by using the observation values and the calculated amounts of noise. For this reason, it becomes possible to calculate a polarization model that is robust against noise. Thus, it is suitable for a device that uses the normal line information, reflection component, and the like calculated on the basis of the polarization model.

REFERENCE SIGNS LIST

10 Information generation system
20 Polarization imaging unit
30 Information generation unit
31-1 to **31-*m*, 31-1,1 to 31-*n,m*** Saturation detection unit
32-1,1 to **32-*n*** m Level correction unit
33 Noise variance model estimation unit
35-1 to **35-*m*, 35-1,1 to 35-*n,m*** Noise amount calculation unit
36 Polarization model estimation unit
201 Image sensor
202 Polarizing filter
205 Polarizing plate.

The invention claimed is:

1. An information generation device comprising:
a noise amount calculation unit configured to calculate an amount of noise on a basis of a noise variance model estimated on a basis of an observation value for each polarization direction of a plurality of polarization directions; and
a polarization model estimation unit configured to estimate a polarization model by using the observation value and the amount of noise calculated by the noise amount calculation unit, wherein
the noise amount calculation unit and the polarization model estimation unit are each implemented via at least one processor.

2. The information generation device according to claim 1, further comprising
a saturation detection unit configured to detect an observation value in a saturated state, wherein
the polarization model estimation unit is further configured to exclude the observation value in the saturated state and then estimates the polarization model, and
the saturation detection unit is implemented via at least one processor.

3. The information generation device according to claim 2, wherein
the noise amount calculation unit is further configured to set a predetermined value as an amount of noise of the observation value in the saturated state in the saturation detection unit, and
the polarization model estimation unit is further configured to exclude the observation value in the saturated state due to that the amount of noise is set to the predetermined value and then estimates the polarization model.

4. The information generation device according to claim 1, further comprising
a level correction unit configured to perform level correction of making the observation value for each of the plurality of polarization directions acquired for each of a plurality of drive modes uniform, wherein
the noise amount calculation unit is further configured to calculate the amount of noise by using the observation value corrected by the level correction unit, a correction gain used in the level correction, and the noise variance model,
the polarization model estimation unit is further configured to estimate the polarization model by using the observation value corrected by the level correction unit and the amount of noise calculated by the noise amount calculation unit, and
the level correction unit is implemented via at least one processor.

5. The information generation device according to claim 4, wherein
the plurality of drive modes are drive modes having different sensitivities or exposure times.

6. The information generation device according to claim 1, wherein
the observation value for each polarization direction of the plurality of polarization directions is an observation value in which the plurality of polarization directions are three or more directions.

7. The information generation device according to claim 1, further comprising
a polarization imaging unit configured to acquire the observation value for each polarization direction of the plurality of polarization directions, wherein
the polarization imaging unit is implemented via at least one processor.

8. The information generation device according to claim 7, wherein
the polarization imaging unit is further configured to store the noise variance model, and
the noise amount calculation unit is further configured to calculate the amount of noise by using the noise variance model stored in the polarization imaging unit.

9. An information generation device comprising:
a noise amount calculation unit configured to calculate an amount of noise on a basis of an observation value for each of a plurality of polarization directions and a variance; and
a polarization model estimation unit configured to estimate a polarization model by using the observation value and the amount of noise calculated by the noise amount calculation unit, wherein
the noise amount calculation unit is further configured to calculate the amount of noise by using a noise variance model showing a relationship between the observation value and a variance, and
the noise amount calculation unit and the polarization model estimation unit are each implemented via at least one processor.

10. The information generation device according to claim 9, wherein
the noise amount calculation unit is further configured to set a variance depending on the observation value as the amount of noise.

11. The information generation device according to claim 9, wherein
the noise variance model is stored in advance in the noise amount calculation unit.

12. The information generation device according to claim 9, further comprising
a noise variance model estimation unit configured to detect a plurality of observation areas from a captured image, obtain a variance from a plurality of observation values and an average observation value in each of the observation areas, and generate a noise variance model from average observation values and variances in the plurality of observation areas, wherein
the noise amount calculation unit is further configured to calculate the amount of noise by using the noise variance model estimated by the noise variance model estimation unit, and
the noise variance model estimation unit is implemented via at least one processor.

13. The information generation device according to claim 12, wherein
the noise variance model estimation unit is further configured to set a flat area in the captured image as the observation area.

14. The information generation device according to claim 12, wherein
the noise variance model estimation unit is further configured to set a still area in the captured image as the observation area.

15. An information generation method comprising:
calculating an amount of noise on a basis of a noise variance model estimated on a basis of an observation value for each polarization direction of a plurality of polarization directions; and
estimating a polarization model by using the observation value and the amount of noise.

16. A non-transitory computer-readable medium having embodied thereon a program, which when executed by a computer causes the computer to execute an information generation method, the method comprising:
calculating an amount of noise on a basis of a noise variance model estimated on a basis of the observation value for each polarization direction of a plurality of polarization directions; and
estimating a polarization model by using the observation value and the calculated amount of noise.

* * * * *